United States Patent
Skell et al.

(10) Patent No.: US 6,227,265 B1
(45) Date of Patent: *May 8, 2001

(54) CONTROL METHOD AND APPARATUS TO DETECT THE PRESENCE OF A FIRST OBJECT AND MONITOR A RELATIVE POSITION OF THE FIRST OR SUBSEQUENT OBJECTS SUCH AS CONTAINER IDENTIFICATION AND PRODUCT FILL CONTROL

(75) Inventors: Daniel G. Skell, Cedarburg; Eric D. Skell, Hubertus; Thomas D. Tagliapietra, Glendale; Michael A. Manthei, Cedarburg, all of WI (US)

(73) Assignee: Electro-Pro, Inc., Cedarburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,369

(22) Filed: Nov. 29, 1999

Related U.S. Application Data

(63) Continuation of application No. 09/053,252, filed on Apr. 1, 1998, now Pat. No. 6,082,419.

(51) Int. Cl.$^7$ ........................................................ B65B 1/04
(52) U.S. Cl. ........................... 141/198; 141/351; 141/360
(58) Field of Search ................................. 141/1, 95, 98, 141/192, 198, 351; 222/52, 64

(56) References Cited

U.S. PATENT DOCUMENTS

| | | | |
|---|---|---|---|
| 3,045,445 | 7/1962 | MacLeod | 62/137 |
| 3,367,128 | 2/1968 | Hosoda | 62/137 |
| 3,727,056 | 4/1973 | Enemark | 250/218 |
| 3,731,496 | 5/1973 | Frazier | 62/137 |
| 3,842,263 | 10/1974 | Kornrumpf et al. | 250/239 |

(List continued on next page.)

FOREIGN PATENT DOCUMENTS

| | | | |
|---|---|---|---|
| 4013743 | 11/1991 | (DE) | |
| 2225064 | 10/1974 | (FR) | |
| 2554244 | 5/1985 | (FR) | |
| 2633081 | 12/1989 | (FR) | |
| 96/17799 | 6/1996 | (WO) | B67D/1/12 |
| 97/25634 | 7/1997 | (WO) | G01V/8/20 |

OTHER PUBLICATIONS

Feinwerktechnik und Messtechnik, vol. 97, No. 6, Jun. 1, 1989 Munchen, DE. pgs. 162–264.

*Primary Examiner*—Steven O. Douglas
(74) *Attorney, Agent, or Firm*—Cook & Franke S.C.; Timothy J. Ziolkowski

(57) ABSTRACT

An automatic container detection and fill control device includes a number of transmitter and receiver pairs arranged generally in parallel such that a transmission from a given transmitter is directed downwardly toward an interior of a container when present in a dispensing station. At least a portion of the transmission is capable of reflection toward a given receiver. A control circuit is connected to the transmitter and receiver pairs to periodically activate a given transmitter and monitor a corresponding receiver. Preferably, the control circuit includes a microprocessor programmed and capable of determining both container presence and a product Fill level by detecting and differentiating signal strengths of reflected transmissions, and activating and deactivating a dispenser in response thereto. The control is capable of detecting the size of a container and dispensing product until the container is considered full. The control includes the ability to detect the presence of foam in a dispensed product, allow the foam to subside, and top off the product in the container. The device provides consistent container detection and fill level control regardless of ice content, prevents the waste of product due to spillage, provides truly hands free operation to allow an operator to perform other chores during the dispensing cycle, all at a very attractive cost.

9 Claims, 29 Drawing Sheets

U.S. PATENT DOCUMENTS

| | | | |
|---|---|---|---|
| 4,202,287 | 5/1980 | Upton | 141/360 |
| 4,282,430 | 8/1981 | Hatten et al. | 250/221 |
| 4,306,147 | 12/1981 | Fukuyama et al. | 250/221 |
| 4,437,499 | 3/1984 | Devale | 141/95 |
| 4,559,979 | 12/1985 | Koblaz et al. | 141/9 |
| 4,747,516 | 5/1988 | Baker | 222/129.1 |
| 4,798,232 | 1/1989 | Stembridge et al. | 141/1 |
| 4,817,689 | 4/1989 | Stembridge et al. | 141/198 |
| 4,822,996 | 4/1989 | Lind | 250/222.1 |
| 4,890,651 | 1/1990 | Stembridge et al. | 141/1 |
| 4,890,774 | 1/1990 | Poore | 222/640 |
| 4,917,155 | 4/1990 | Koblasz et al. | 141/1 |
| 4,972,883 | 11/1990 | Hassell | 141/1 |
| 4,973,834 | 11/1990 | Kim | 250/221 |
| 5,002,102 | 3/1991 | Hösel | 141/94 |
| 5,036,892 | 8/1991 | Stembridge et al. | 141/1 |
| 5,059,812 | 10/1991 | Huber | 250/577 |
| 5,159,834 | 11/1992 | Eisele | 73/293 |
| 5,164,606 | 11/1992 | Secord | 250/577 |
| 5,245,177 | 9/1993 | Schiller | 250/221 |
| 5,250,801 | 10/1993 | Grozinger et al. | 250/223 B |
| 5,550,369 | 8/1996 | Skell et al. | 250/222.1 |
| 5,573,041 | 11/1996 | Skell et al. | 141/1 |
| 5,862,844 | 1/1999 | Perrin | 141/351 |

CONTROL METHOD AND APPARATUS TO DETECT THE PRESENCE OF A FIRST OBJECT AND MONITOR A RELATIVE POSITION OF THE FIRST OR SUBSEQUENT OBJECTS SUCH AS CONTAINER IDENTIFICATION AND PRODUCT FILL CONTROL

CROSS REFERENCE TO RELATED APPLICATION

This application is a continuation of allowed U.S. application Ser. No. 09/053,252, now U.S. Pat. No. 6,082,419, filed Apr. 1, 1998.

BACKGROUND OF THE INVENTION

The present invention relates generally to a control method and an apparatus to detect the presence of a first object and monitor a relative position of the first object, or subsequently placed objects. The invention relates more specifically to a control method and apparatus to detect the presence of a container within a dispensing station and automatically controlling a fill level of dispensed product into the container until the container is considered full.

Aside from making the dispenser control fully automatic, a main consideration in the development of the present invention is to provide an automatic dispensing control which can compete economically with prior art lever actuated dispensing valves and manually operated push-button electric switch valve controls. To be commercially successful in this market, a dispensing valve control must demonstrate not only the automatic characteristics of detecting the presence and absence of a container and activating or deactivating a dispenser in response thereto, but also provide reliable fill control with limited operator interface.

One common method of automatic dispensing for soft drinks in the prior art is based on time portion control. An example of such a method is disclosed in U.S. Pat. No. 4,890,774 that shows a valve having multiple push buttons corresponding to different sized containers, such as small, medium, large, etc. When one of these buttons is depressed, a beverage is dispensed for a predetermined time period assigned to that individual size. The primary disadvantage of such a system is that differences in ice portions can cause the container to be either over or under-filled. In application, these controls may have a "top off" button to fill the container in the event a user does not place enough ice in the container. Where such differences in ice portions cause the container to be under-filled by the timer, the "top off" button is depressed which causes the dispenser to activate for a short predetermined time. However, when under-filled by only a small amount, the "top off" cycle may actually overfill the container. Conversely, if too much ice is first placed in the container, the predetermined dispense time will initially overfill the container. An overfill not only results in waste of dispensed product, but also excess operator time for cleaning each overfilled container. Such systems may also experience fill level problems due to variations in flow rates, which are common in soft drink dispensing machines due to variations in liquid line pressure. Further, when an operator mistakenly pushes a button relating to a container larger than the container to be filled, the control will overflow the container by an amount of product equal to the difference in container sizes resulting in even more waste. These programmable timers also require reprogramming the dispensing times each time the establishment changes the container sizes. Another limitation of these controls is that they are labor intensive in that they require the operator to consistently place the correct amount of ice in the container for that particular container size, and any variation in the ice will require the operator to spend additional time at the dispensing machine to depress the "top off" button, and since the "top off" cycle is so short, the operator will usually stand there and wait for the end of the cycle. Such a system inevitably results in inconsistent fill levels which can create customer dissatisfaction and/or wasted product. Timed portion control units have been used in non-self serve applications for many years despite the many shortcomings because to date, it has been considered the best overall system.

Another such system is disclosed in U.S. Pat. No. 4,202,287 which shows a fluid dispensing control system sensing a container size with a set of photosensor and associated light sources that activate a timer in the control system for dispensing fluid for a pre-determined time dependent on the container size detected. However, this system continues to dispense until a timing cycle is completed regardless of whether or not the cup is still present under the dispensing valve. Also, the amount of fluid dispensed is dependent upon preset container sizes. That is, if an establishment changes the size of its medium size cup, the preset amount of fluid dispensed for a medium size cup must be changed or else the cup will not be filled or will be overfilled. This is particularly problematic when the diameter of a container is changed because such a change is usually overlooked but results in volume change that affects fill level.

Other methods of automatic dispensing are described in U.S. Pat. Nos. 4,559,979, 4,798,232, 4,817,689 and 4,890,651, and 5,036,892. Such systems employ ultrasonic transducers located adjacent the dispensing spigot to sense the location of a container and/or the product level in the container. When a container is located underneath the spigot, the control is designed to dispense product into the container. The transducer monitors the liquid level and halts the flow of the beverage when the container is sufficiently filled. One disadvantage of this system is the high cost of the control and transducer. Another shortcoming is the control's limited ability to recognize foam. It has been observed that the response rate of the ultrasonic sensor is generally not fast enough to accurately track the changing foam level and therefore, causes the foam to spill over before the dispenser is deactivated. In the one such patent, ultrasonic energy is used for sensing the machine grate, the cup lip, the top of any ice in the cup, and the rising liquid level, and thereafter generates signals corresponding to the travel time of the ultrasonic energy to a control module. In order to accomplish this, changes are made to the gain for various distance measurements. Further, dip switches are used for setting the ice level. If it is determined that the actual ice height in a container is greater than that allowed by the dip switch settings, an over-ice indicator flashes and the cup detection routine begins again. The system will not activate the dispenser unless the actual ice height is less than the amount selected by the dip switches. The use of ultrasonic components and extensive software and hardware results in a system that is relatively expensive. The application for this technology in the market place has been limited due to these limitations.

Another method of automatic dispensing is described in U.S. Pat. No. 4,972,883. In such a system, the container base is positioned at an angle with respect to the dispenser and the container is placed against a long lever to dispense product. The lever is connected to an electrical switch and when the container is pushed against the lever, the switch closes and activates a solenoid to dispense beverage. Beverage flow is halted when the container is removed from the lever or when a product spills over the lip of the container and liquid is sensed on the lever. One disadvantage of this system is that it is not a true contact-free dispensing system because the container must contact the lever in order to vend the product. Another disadvantage of this system is that when a container is not physically removed, the dispenser is not deactivated until the beverage spills over the side, thus causing both the container and the lever arm to become sticky with syrup and causing waste of product.

It would be advantageous to have a method and apparatus capable of detecting a container position under a dispenser and capable of monitoring a fill level after dispenser activation to accurately fill a container regardless of the ice content, the container size, independent of operator interface, monitor the continued presence of the container, and at a cost effective end cost.

SUMMARY OF THE INVENTION

In a broad sense, the present invention provides a system for detecting the presence of a first object, and while monitoring the continued presence of the first object, is capable of monitoring a relative position of the first object, or subsequently placed objects. In one application of the present invention, the system includes a control to detect the presence of a container within a dispensing station, and while monitoring the continued presence of the container, automatically dispensing a product into the container while monitoring the fill level of the dispensed product in the container with reference to the container size until the container is considered full.

In accordance with one aspect of the invention, an automatic container detection and fill control device is disclosed for use in a dispensing apparatus. The device includes a transmitter and receiver pair arranged generally in parallel such that a transmission from a transmitter is directed downwardly and is capable of reflection from an interior of a container when present. Control circuitry is provided and connected to the transmitter and receiver pair to periodically activate the transmitter and monitor the receiver. Based on the reflections from the inside of the container, the control circuitry is capable of determining both container presence and a fill level by detecting and differentiating signal strengths of reflected transmissions transmitted by the transmitter and received by the receiver and activates the dispenser in response thereto.

The present invention can be implemented with discrete circuitry and logic gates, but in a preferred embodiment, is implemented with a programmed microprocessor, a microcontroller, or any other suitable, equivalent electronic programmable device. In a preferred embodiment, the microprocessor is programmed to periodically activate each of a series of transmitters, and periodically monitor each of a series of corresponding receivers in sequence with each transmitter activation. The system is programmed to differentiate stray energy reception from intended transmissions from the transmitters and for quality assurance, uses a running average of a number of received signals indicative of the reflected energy beams from the interior side wall of the container. The system monitors the relative strength of each reception and stores the largest reception on a per dispense basis and automatically adjusts gain control of the transmitters to optimize an internal analog to digital converter. In comparing the relative strengths of reflected transmissions, the system is able to accurately indicate the presence of a container within a dispensing station located under a dispenser, and activate the dispenser in response to container detection.

In accordance with the present invention, the placement of the transmitters and receivers create specific target areas along the length of the inside surface of the container such that as product is being dispensed and is rising in the container, the product interferes with the reflections of the transmissions and causes a change in the corresponding level of receptions in the receivers. By monitoring the changes, the present system can not only accurately control the dispenser to fill the container to a substantially full level, it can also monitor the fill rate and make internal adjustments in response to variations in liquid line pressure, foam rate, and ice level while continually monitoring the continued presence of the container. A slow fill rate can also be used to alert an operator that the product being dispensed needs refilling.

Another advantage of the present device is that it is capable of detecting the presence of a cover on the container, and the presence of an already filled container, so that dispensed product is not inadvertently wasted. Another advantage, which will be particularly useful in other applications, includes an initial determination that the container has a bottom so that the dispenser cannot be "fooled" into dispensing product into a noncontainer, such as a cylindrical tube, or simply a piece of cardboard stock purposely or inadvertently placed close to the dispenser.

Although the control of the present invention is hereinafter described in detail with reference to a soft drink dispensing application, it is readily evident to those skilled in the art that the present invention can be used in virtually any type of dispensing application and in applications that do not require dispensing. For example, another application of the present technology may include detecting the position of articles on an assembly line, the accurate placement of those articles, and the relative position of the articles, as well as the continued movement of the assembly line. Such an application would provide an early warning of problems on a fully automated assembly line.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1A:
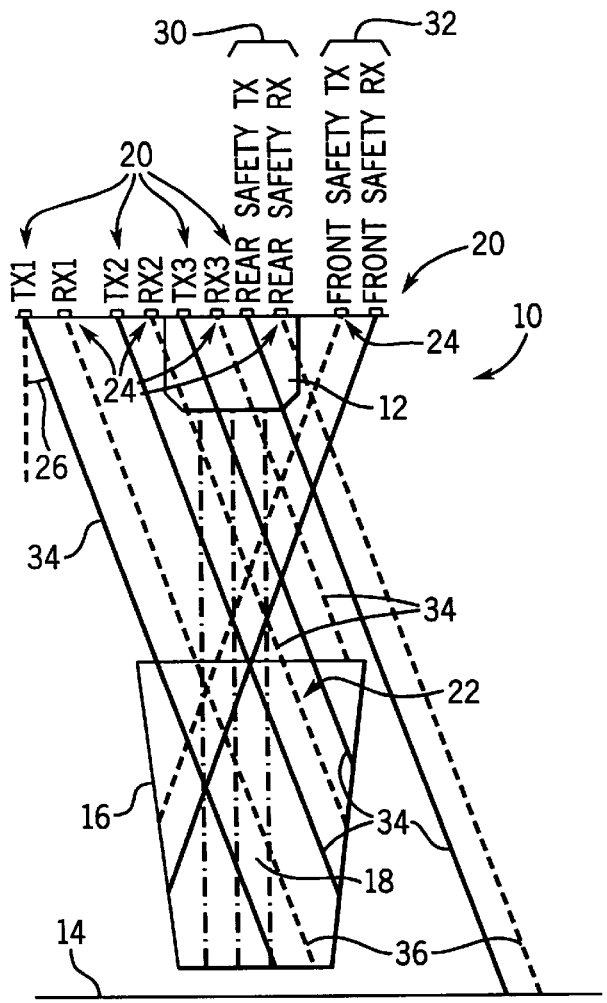
FIG. 1(a) is a side elevation view of a container located in a dispensing station under a dispensing spigot depicting the operating environment in accordance with one application of the present invention.

The basic theory of the present invention, as applied to a dispensing machine, is based on transmitting energy, preferably infrared light, in a downwardly direction toward an interior wall of a container that is located sufficiently below a dispenser to allow proper dispensing such that a reflection of energy can be received and processed by a control. Once the energy is received, it is processed to determine a status of the container. The status includes determining whether the container is stationary (i.e. static mode) or held by a user subject to movement (i.e. dynamic mode). In static mode, the container is positioned under the dispenser and left stationary during the entire dispense cycle. During dynamic operation, the container is positioned under the dispenser and within a window to allow the container to move slightly, but still remain in position. The dynamic mode may also be used to refill a container that is nearly full or one with a foamy liquid dispensed therein.

It is contemplated that most applications of this control will require a substantially parallel transmitter and receiver system directed downwardly to intercept the generally vertical wall of a container to be filled. As will be described in further detail with reference to each figure, in the preferred embodiment, the transmitters and receivers are mounted at a 20° angle as referenced to the z-axis and at a 12° angle as referenced to the y-axis. The angle referenced to the y-axis is used when the sensor is displaced on the x-axis with respect to the dispenser spout or spigot. While these angles may be adjusted, the preferred angles were chosen as a function of the distance from the sensor to the container relative to its position under the dispenser, and the requirements for sensor positioning. The radiation angle of the transmitters and the viewing angle of the receivers, as determined on a per application basis, is a function of the distance of the transmitter and receiver pair to the container wall, and the registration definition required to meet the specific application. As the sensor to container distance increases, the included angle of the beams must decrease to retain the equivalent target registration, all as will now be understood by those skilled in the art.

A portion of the energy that intercepts the vertical wall of the container is directed downward toward the container bottom or toward the product within the container. The energy actually returned to the receiver which was reflected from the wall itself, is minimal compared to the total energy transmitted. The majority of the energy is scattered throughout the container and not returned within the viewing angle of the receiver. An additional portion of energy is reflected and detected by the receiver from the area that forms the junction between the container walls and the container bottom, or from the area that forms the junction between the container walls and the product surface. This junction is referred to as a "hot spot." The strength of the signal reflected only from the wall itself is the criterion used to determine the fill level and the fill rate. An empty container generally returns a signal that is stronger overall than the signal returned directly from the wall of the container alone, mainly due to this "hot spot."

The energy transmitted in this system is not necessarily limited to infrared (IR) light, but can also include the entire visible spectrum of light, lasers, sound waves, radar, radio waves, microwaves, or any other energy form that is capable of being transmitted, reflected and detected. Infrared light is the preferred form of energy today, generally because of the inexpensive transmitters and receivers and is the preferred form of energy as used herein. Visible light can have a distinct advantage over IR in some applications however, since the transmitted energy can be used not only for fill control but also as a visual feedback of the fill status. Visible light can also be used alone or coupled with other energy sources to enhance or highlight the product being dispensed or the positioning target. The availability of inexpensive components for the infrared or visual light sensors make these the preferred energy source for many applications. Extending the sensor to container distance may require the use of other energy sources, such as laser energy. Laser beams would be an excellent choice in systems that require higher resolution at greater distances. As the cost of components employed by alternate energy sources are reduced, these other forms of energy may become preferred.

Radiated light is the energy of choice even though it has the disadvantage of primarily refracting through a clear product instead of being fully reflected. In many cases, since clear products allow the light to penetrate the product with only a small portion of the light being returned to the receiver, the returned signal is compared against the equivalent signal returned from the preceding beam on a per beam basis. This actual change in signal strength, relative to the last read, is compared to further define the actual fill level and relative fill rate for the product.

Figure 9:
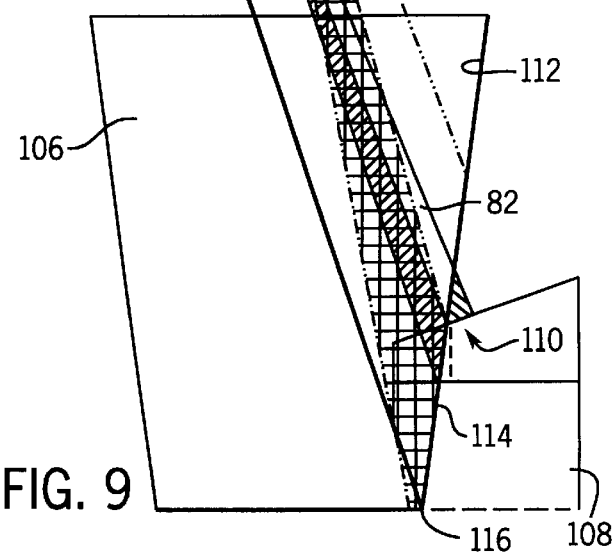
FIGS. 9–11 are similar to that of FIGS. 4–8, but with the addition of a positioning stop in accordance with another aspect of the invention.
Figures 9A, 10:
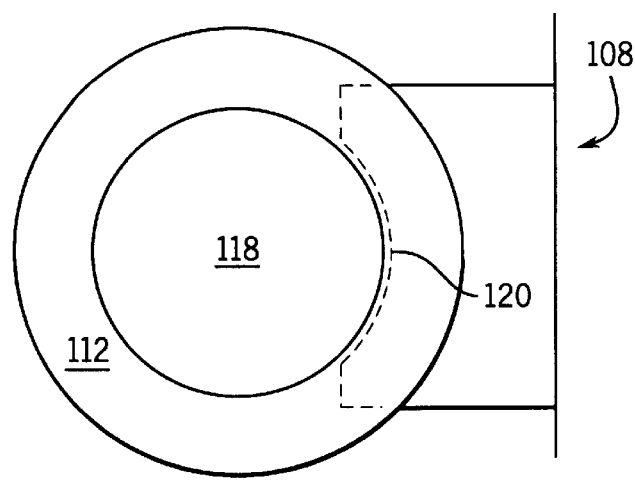
Figure 11:
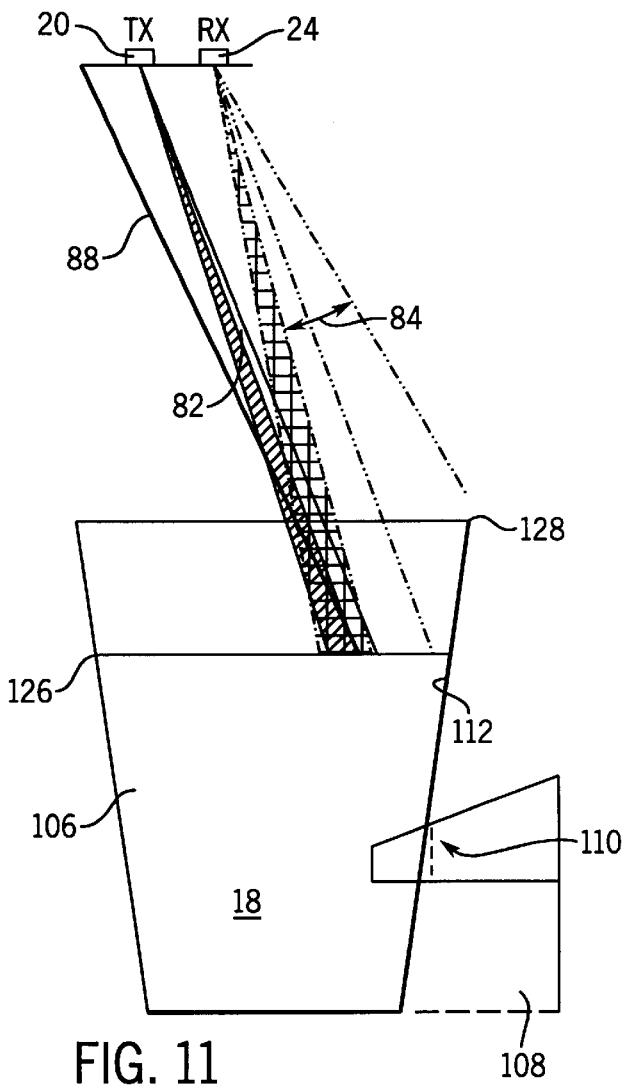

In most applications, the standard light radiation system described above will perform satisfactorily. In some instances however, signal enhancing may be required in applications employing extremely clear containers that require high resolution. Where there is no desire to use clear containers, there is no need for such signal enhancing methods. FIGS. 9–11 illustrate the use of a signal enhancing system employing a "reflective target" which can be either a container stop or a container base rest to enhance reflection. The transmitters and receivers would be directed toward the reflective target. This implementation can also be effectively used with opaque containers and the same control logic can be used in the enhanced control system. The system would first read the status of the receivers on a power up and determine whether a reflective target is in place. Since the signal received from a clear container is much less than from an unobstructed target, the decrease in signal would indicate that a clear container is in position to dispense. On the other hand, the signal received from an opaque container would be much less than from either the unobstructed target or from a clear container with a target and would indicate that an opaque container is in position to dispense.

Some products require special fill recognition logic and may also be handled efficiently with this system. Products that are clear, opaque, or have a generally static surface do not require extensive signal processing. The following are unique examples of this systems versatility to handle a wide range of products that may utilize more extensive signal processing that is incorporated into subroutines of the present invention.

The first are products that foam, such as carbonated beverages. These require additional monitoring logic to compensate for the foam and provide proper fill control. The foaming action can be detected by an abnormally high fill rate and/or an increase in signal strength rather than a decrease in signal strength, as product rises through the target area produced by a transmitter and receiver pattern. When multiple transmitter/receiver pairs are used, the rate that the product rises through the individual pairs can be used to stop the dispensing process early in order to account for the foaming action. The same logic can start the fill process as the foam recedes so the product can be "topped off" in order to obtain the desired final fill level. It is believed that an alternate energy source would also solve this problem.

The second category includes products that are highly reflective, like high gloss paint. These require additional monitoring logic when the fill process is monitored with light as the energy source. The reflection from the product can be detected as soon as the dispensed product covers the bottom of the container. At this point, the returned signal would normally be expected to decrease, but would actually increase with such reflective products. The initial reversed signal logic of the returned signal would indicate to the control system that the product was highly reflective. Subsequent control logic would then be reversed relative to the product in the targeted viewing window. In some cases, the use of an energy source other than light may be an equivalent substitute to solve this problem.

Another category includes products that have a dynamic surface during the fill process. The dynamic surface could be due to a fast fill rate that generates an extreme wave pattern on the product's surface. For some applications, a modified transmitter, as outlined in FIG. 3(f) and having a transmission pattern shown in FIG. 3(e), would be a major improvement to the system with minimal additional costs. Alternatively, additional transmitter and receiver pairs positioned to divide and view additional areas of the container wall would be another solution.

The system, in many applications, doesn't require external calibration. The signals received from the walls are compared to a base reference value that is established when the system is first initialized. When the product displaces a portion of the wall target, the signal is proportionally decreased or increased as referenced to the base reading, independent of the other transmitter/receiver pairs. The rate of change through the target determines the relative position within the target for that transmitter/receiver pair. This rate of change, along with the total change recorded during the present fill cycle for that pair, is compared to the same parameters of the preceding and following pairs to further define the relative position of the product within the container.

Further, container shape is not a critical factor since the signals received from the walls are relative to a base reference value determined when the system is first initialized. The only major requirements are that the opening of the container is below the spout of the dispenser and that the walls allow a target to be recognized on its surface, or in the case of a clear container, through the container to a defined target.

A wide variety of products can be monitored with this system including, but not limited to, water, ice, soda, beer, liquor, juices, caustic chemicals, powdered products of many varieties, syrup, etc.

Referring to FIG. 1(a), a dispensing machine 10 is shown incorporating the present invention. Although most dispensing machines 10 have a plurality of dispensers 12, for simplicity, the figures demonstrate the present invention with respect to a single dispenser 12. The dispensing machine 10 also includes a container station 14 situated under the dispenser 12. In operation, a container 16 can be placed either directly on the container station 14 to receive a dispensed product 18 from dispenser 12, or while held by a user as depicted in FIG. 1(a) which shows the dynamic mode of operation. The static mode of operation is where the container 16 is set on base 14 of the container station and not moved until the fill operation is complete. The dynamic mode of operation is also used for topping off a partially filled container.

In a preferred embodiment as shown in FIG. 1(a), a plurality of transmitters 20 are arranged to transmit downwardly toward an interior 22 of container 16 wherein at least a portion of the transmitted energy is capable of reflection toward at least one receiver 24. In the preferred embodiment, a plurality of receivers 24 are arranged in a general parallel configuration with the plurality of transmitters 20. However, one or two wide viewing angle receivers can be utilized with up to approximately four transmitters where achieving a lower cost is more desirable than accuracy and repeatability. This alternative concept is embodied in the scope of the appending claims.

Each of the transmitters 20 and receivers 24 have a radiation pattern 34 and a reception area 36 which are best viewed with reference FIG. 4–11. For simplicity, FIGS. 1(a)–(c) show the radiation and reception areas 34, 36 as a line centered on the actual radiation and reception patterns.

Figure 1B:
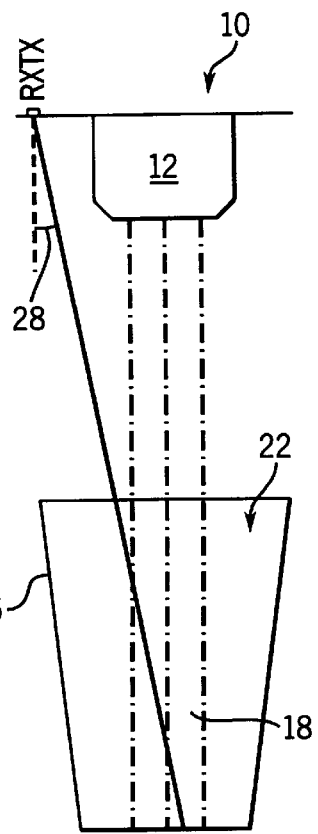
FIG. 1(b) shows a front elevation view of the arrangement shown in FIG. 1(a).

Ideally, each transmitter 20 is paired with the receiver 24 and are mounted at a 20° angle as indicated by reference numeral 26, as shown in the side view of FIG. 1(a), and a 12° angle, as shown by reference numeral 28, as viewed from a front view as shown in FIG. 1(b). This provides transmitter/receiver interception points on the interior 22 of container 16 that intercept the inside side wall of the container 16 at a point normal to the vertical center line of the container to provide a desired amount of reflection toward the receivers 24. The pairs of transmitters and receivers are shown as TX1 and RX1, TX2 and RX2, TX3 and RX3, Rear Safety TX and Rear Safety RX, and Front Safety TX and Front Safety RX. The actual number of transmitter and receiver pairs used, depends on the accuracy desired, as well as the number of different cup sizes to be detected and filled. In the simplest application, a single transmitter and receiver pair is capable of detecting the presence of a container and when a container is full. On average, it is believed that three pairs of transmitter and receivers will be sufficient for accurate container detection and fill control. Optional safety transmitters and receivers are used to ensure the cup is within a predefined window. In other words, the rear safety transmitter and receiver pair 30 prevent the container from being moved in too far, while the front safety transmitter and receiver pair 32 prevent dispensing if the container is pulled too far out. These assurances can alternately be accomplished with the other transmitter/receiver pairs if less accuracy is allowable.

FIG. 1(b) shows a front view of the dispensing machine 10 in which each of the transmitters 20 and receiver 24 are mounted with a mounting angle of approximately 12° from the vertical. The 12° angle is used to offset the displacement of the transmitters and receivers with respect to the dispenser 12 to provide a relatively normal intersection point with the inside surface side wall of the container as will be described with reference to FIG. 2.

Figure 1C:
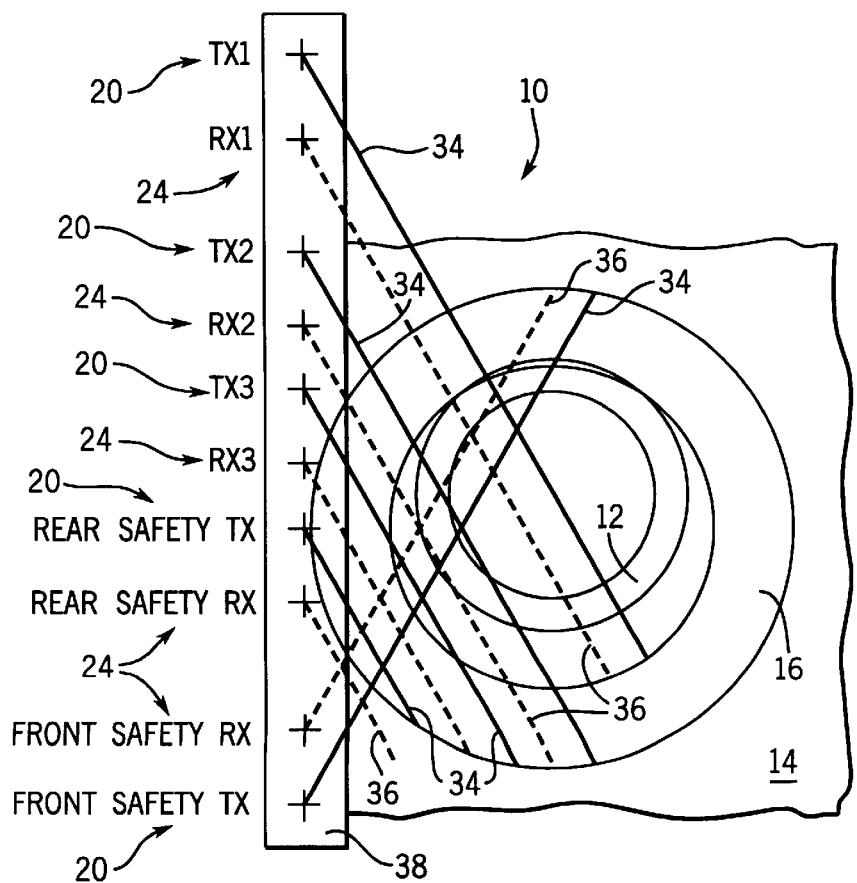
FIG. 1(c) shows a top elevation view of the arrangement of FIG. 1(a).

FIG. 1(c) is a top view of a dispensing machine 10 with a transmitter and receiver mounting block 38 having the transmitters 20 and receivers 24, TX1 and RX1, TX2 and RX2, TX3 and RX3, Rear Safety TX and RX, and Front Safety TX and RX mounted therein. The mounting block 38 is shown in the same plane as the dispenser 12, while the container 16 is placed there below on or near the base of the container station 14. FIG. 1(c) shows a compound of the two mounting angles 26 and 28 of FIGS. 1(a) and 1(b), respectively, wherein the radiation and reception patterns 34, 36 are angled downwardly and outwardly into container 16 toward a surface of the container which is capable of reflecting at least a portion of the transmission from each transmitter 20 back to the respective receiver 24.

As will become more evident from the detailed description and the drawings, the individual transmissions from each transmitter 20 are directed at various heights inside the container 16 so as to create different target areas at varying levels to determine the level of dispensed product inside container 16 at any particular time in a dispensing cycle.

Figure 2A:
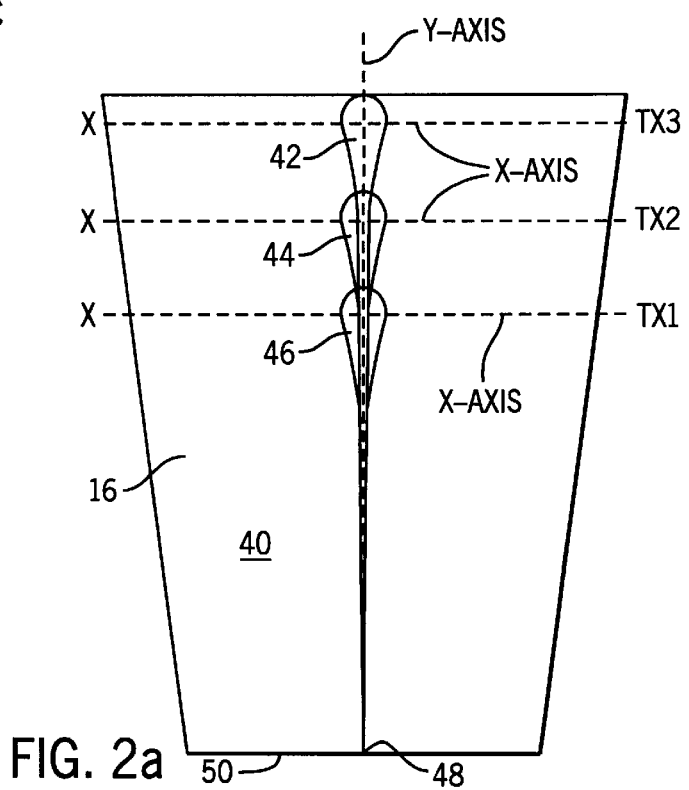
FIG. 2(a) shows a side elevation view of a container according to one aspect of the invention.
Figure 2B:
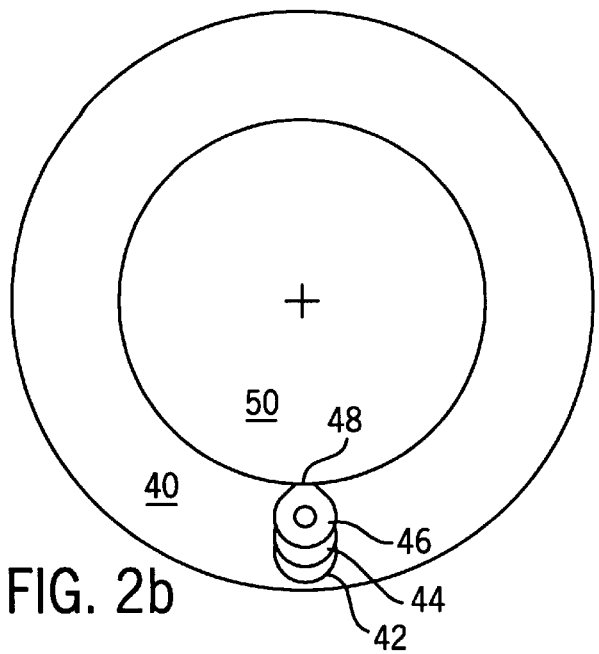
FIG. 2(b) shows a top view of that of FIG. 2(a).

FIGS. 2(a) and 2(b) show respective radiation patterns 42, 44, 46 from transmitters TX3, TX2, and TX1, each having an included angle of approximately 2°. Referring to FIG. 2(a), the interior wall 40 of container 16 is shown having radiation patterns 42, 44, and 46 thereon from transmitters TX3, TX2, and TX1, respectively. The radiation patterns 42, 44, and 46 are shown stacked upon one another along a y-axis for comparison. In reality however, the location of the radiation patterns is a function of the mounting angles of the transmitters 20 in mounting block 38. It has been found that it is more practical to provide constant mounting angles for transmitters 20 in mounting block 38, as shown in FIG. 1(a)–(c), as opposed to attempting to stack each perfectly.

As indicated in FIG. 2(a) and 2(b), a portion of the transmitted energy is shown trailing downward along the inside surface 40 of the container 16. The intersection of the interior wall 40 and the container bottom 50 creates an energy collection point for the downwardly radiated energy which is also referred to as the "hot spot". For all practical purposes, the radiated energy above the x-axis of FIG. 2(a), comprises the majority of the signal returned to the receivers from the side wall 40 itself which is due to slight irregularities in the surface of the interior side wall 40 of container 16. However, below the x-axis center line of each transmission, energy is reflected back from not only the irregularities in the interior side wall 40, but also from the hot spot 48. It is evident from FIGS. 2(a) and 2(b) that the relevant placement of the radiation patterns 42, 44, and 46 along the x-axis is much more critical than that along the y-axis, because it is the x-axis placement which is used to control the fill level in container 16.

This configuration also demonstrates how the present invention can be used as a fill rate detector. That is, as product is being dispensed into container 16, and the product level moves up the y-axis, the incremental change along the y-axis can be monitored. This incremental change in the product level will cover increasing amounts of each radiation pattern below the x-axis center lines. The same increment along the y-axis, above the x-axis, will displace smaller amounts of received energy due to the decreasing area of the target on the container. In other words, as the dispensed product enters the target area, each incremental change in product level has a larger impact on the return signal until it is past the horizontal center line of the target area after which, each incremental change has a decreasing effect. This rate of change is used to define the product fill rate and the product level in the container at any time, and is used to establish a variable fill rate to stop dispensing before the container is full, to compensate for product in flight once the stop signal is produced, and/or to control the stop dispensing signal when excess foaming of the product is detected.

As thus far described, the majority of energy transmitted by the transmitters 20 into the container 16, is scattered and not returned within the viewing angle 36 of the receivers 24. Further, the energy that is returned to the receivers 24 from the walls 40 of the container 16, is minimal compared to the total energy transmitted. FIGS. 3(a)–3(e) demonstrate methods for maximizing the transmitted and returned energy.

Figure 3A:
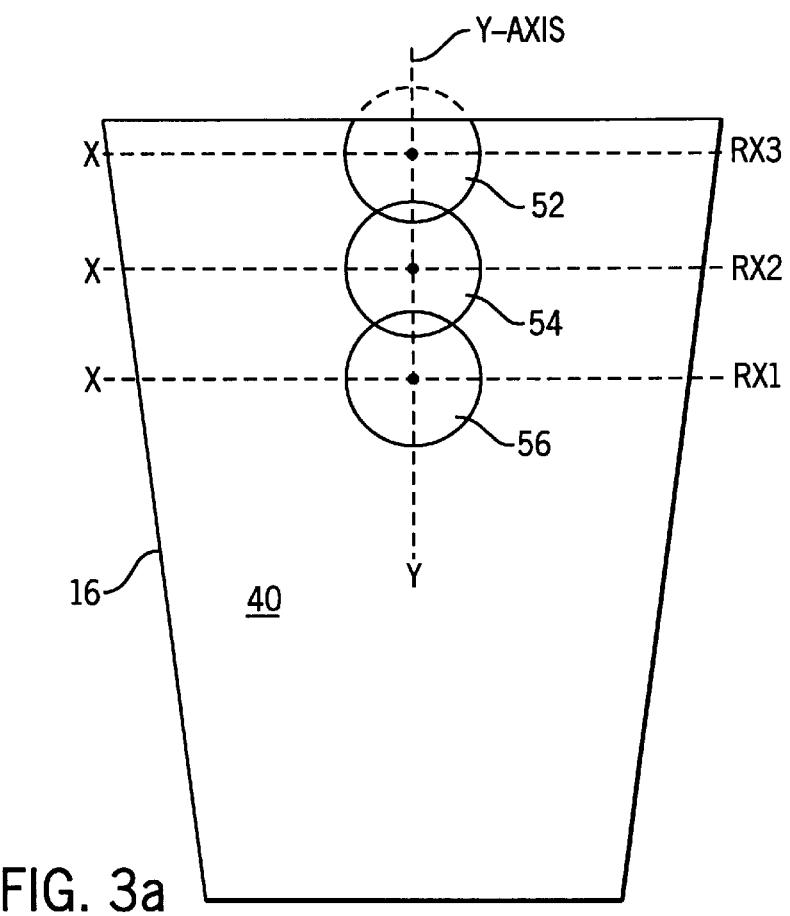
FIG. 3(a) shows a side elevation view of a container according to one aspect of the invention showing various transmitter radiation patterns.

FIG. 3(a) shows the respective area on the container wall 40 within the viewing angle of each receiver RX3, RX2, and RX1. Each of the receivers 24, FIG. 1, are displaced from a respective matching transmitter 20 so as to intercept radiated energy from the container wall 40 as shown in FIG. 3(a) so as to minimize direct recognition of energy reflected from the surface of a dispense product within container 16. The viewing angle in FIG. 3(a) was chosen as 10°. Target area 52 is the radiation pattern on the container side wall 40 in which receiver RX3 will receive reflected energy transmitted by transmitter RX1. Similarly, target area 54 is the area on the container side wall 40 which will accept reflections from transmitter TX2 into receiver RX2. Receiver RX1 will receive reflected energy transmissions from TX1 within the target area 56.

Figure 3B:
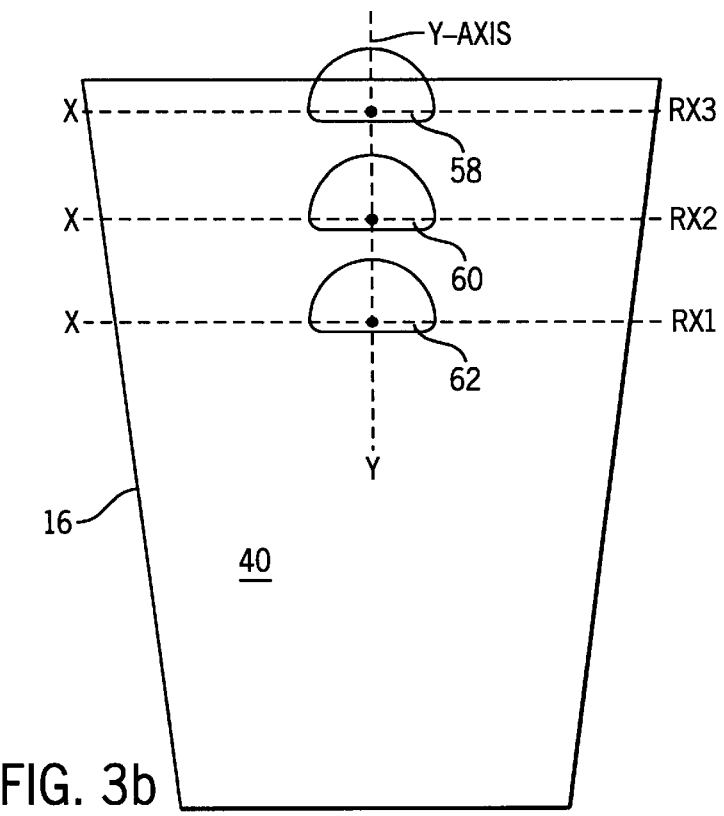
FIG. 3(b) shows a side elevation view similar to that of FIG. 3(a) having modified receiver target areas.

FIG. 3(b) shows an example of how the receivers RX can be focused to receive energy from predefined areas. This example shows the results of blocking approximately one-half of an inlet orifice of each receiver RX1, RX2, and RX3 to reduce the effect of reflection from a dispensed product in container 16. The resulting focused target area 58 will limit the amount of energy originally transmitted from transmitter TX3 that will be received within the viewing area of receiver RX3. Receiver RX2 will only receive reflected energy from that portion of the container side wall 40 as depicted by focused target area 60, and receiver RX1 will only receive transmitted energy from transmitter TX1 within the focused target area 62. In this manner, the signal produced by each receiver 24 is the result of having most of the energy reflected below the x-axis blocked, thereby providing more precise fill level control and/or fill rate status control as the product moves through the targeted viewing window.

Figure 3C:
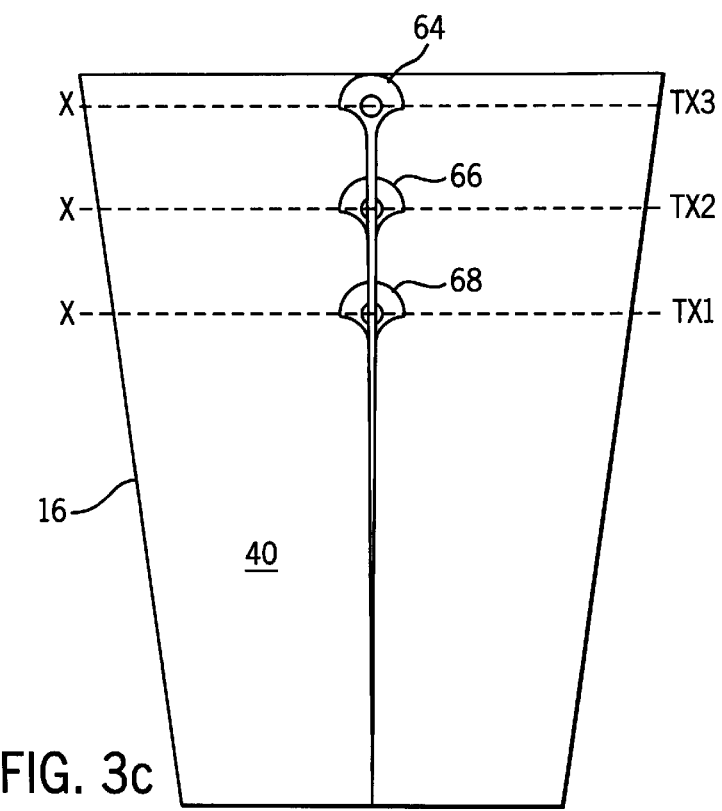
FIG. 3(c) shows a side elevation view of a container according to another aspect of the invention showing focused transmitter radiation patterns.
Figure 3D:
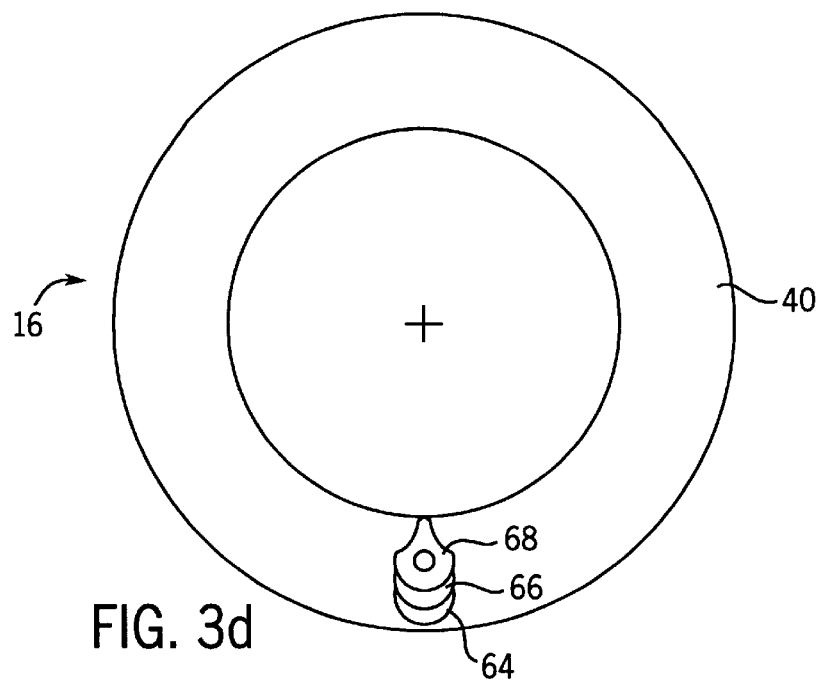
FIG. 3(d) shows a top view of that of FIG. 3(c).

Similarly, FIG. 3(c) shows how the radiation pattern for each transmitter TX1, TX2, and TX3 can be modified to enhance the effective radiation pattern transmitted to the container walls 40. The resulting focused radiation patterns 64, 66, and 68 from transmitters TX3, TX2, and TX1, respectively, are the result of blocking approximately one-half of the output orifice of each transmitter. This beam shaping reduces the effective reflection from the dispensed product. In this configuration, the majority of energy transmitted from each transmitter TX below the x-axis is blocked and not returned within the viewing angle of the receivers, and the resulting energy returned to the receiver from the container wall 40 is actually minimal. The radiation pattern before modification is 2°, and with modification, one-half of the radiation pattern is effectively blocked. FIG. 3(d) is a top view of the container 16 showing the overlap of the radiation patterns 64, 66, and 68. This arrangement also provides more precise fill level control and/or fill rate status control as the product moves through the targeted viewing window.

It has been found that using the receiver pattern control shown and described with reference to FIG. 3(b) in conjunction with the radiation pattern control shown and described with reference to FIG. 3(c), the overall fill control becomes much more predictable and more selective in regard to container wall 40 interrogation. However, in some applications, such orifice control may not be required. Alternate methods may also be used, such as designing the lens of the particular transmitters and receivers to perform the equivalent function, but at additional cost.

Figure 3E:
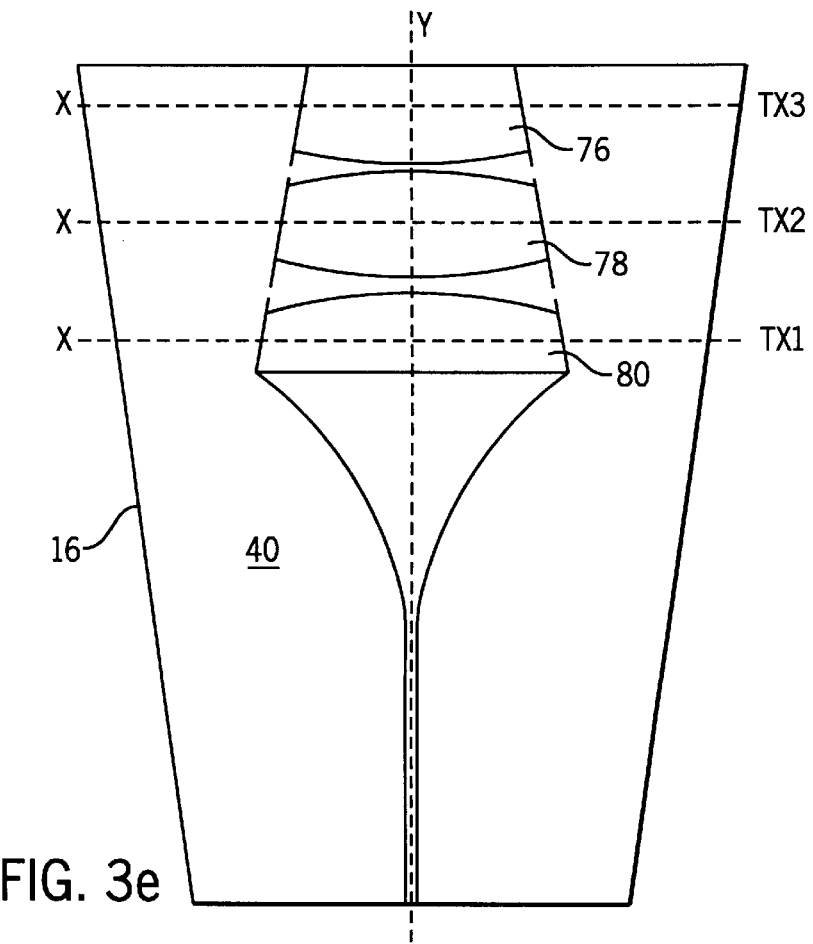
FIG. 3(e) shows a side elevation view of a container according to another aspect of the invention showing focused transmitter radiation patterns.
Figure 3F:
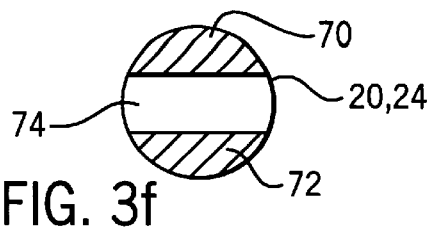
FIG. 3(f) shows an enlarged view of an orifice control for creating the radiation patterns of FIG. 3(e).
Figure 3G:
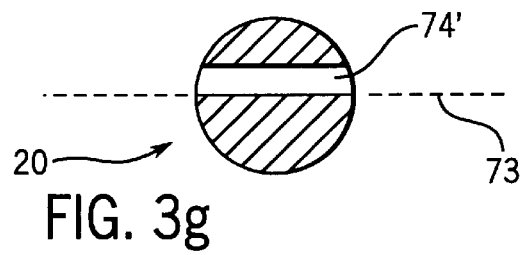
FIG. 3(g) shows another embodiment of an enlarged view of an orifice control for creating the radiation patterns of FIG. 3(h).
Figure 3H:
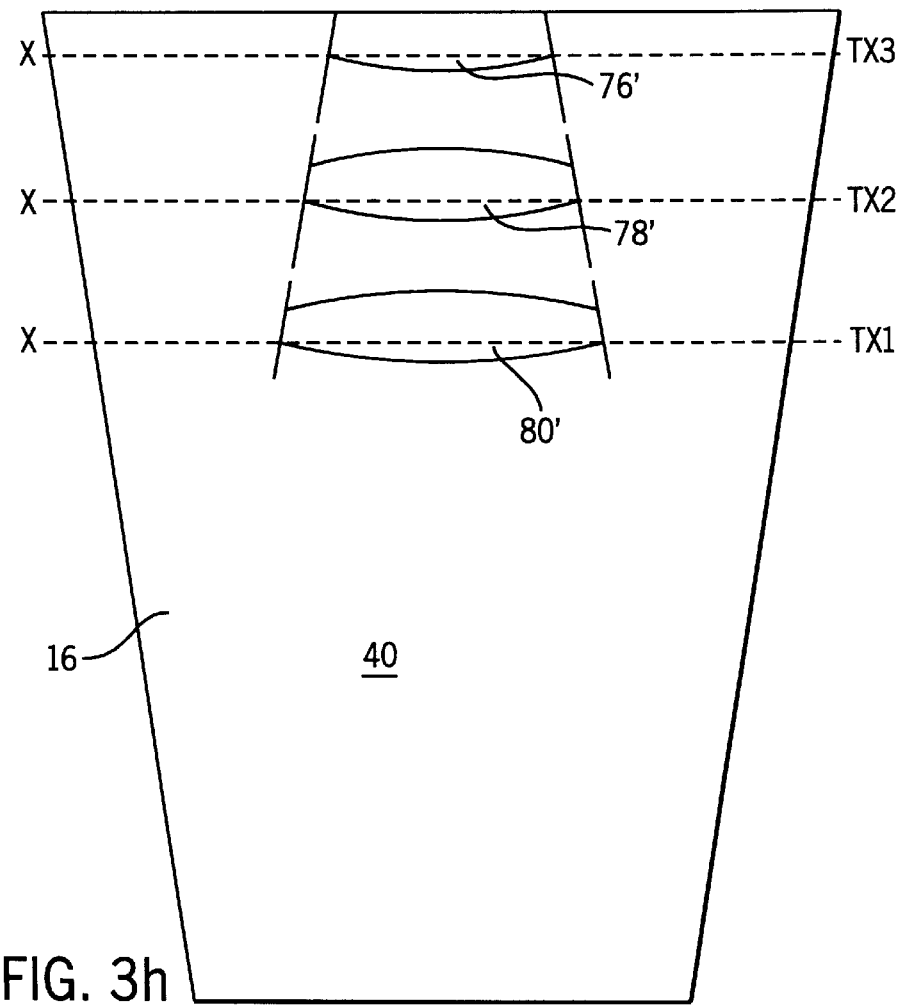
FIG. 3(h) shows a side elevation view of a container according to another aspect of the invention showing the focused transmitter radiation patterns achieved with the orifice control of FIG. 3(g).

FIG. 3(e) shows an alternate method for enhancing the effective radiation pattern transmitted to the walls 40 of container 16. The transmitter radiation angle was originally 10°, but with beam shaping, the transmitted energy is blocked beyond 2° with the transmitter orifice control shown in FIG. 3(f). A transmitter 20 or receiver 24 has an upper beam control 70 and a lower beam control 72 thereby only allowing energy transmission through beam passage 74 which transmits energy at approximately a 2° radiation or viewing angle. A transmitter 20 equipped with the beam controls 70 and 72 of FIG. 3(f), creates a radiation pattern such as that shown in FIG. 3(e). Focused radiation patterns 76, 78, 80 are produced by such equipped transmitters TX3, TX2, TX1, respectively. This method provides for more predictability and more selective wall interrogation by limiting the area interrogated along the Y-axis and providing broader results along the X-axis. Such precise control has been found to be most advantageous when monitoring a dispensed product having a dynamic surface. That is, a product which exhibits excessive motion or foaming when being dispensed. As is evident, this approach will dampen the effect of the dynamic surface by viewing a larger portion of the containers wall 40 along the X-axis. However, in many applications such orifice control is not required, and in some applications, lens design can perform the equivalent function but with added cost. A transmitter equipped with a single control, for example, lower control 72 and having a 2° radiation angle, will produce patterns similar to that shown in FIGS. 3(c) and (d). FIG. 3(g) shows yet another embodiment for enhancing the effective radiation pattern transmitted to the interior walls of a container. FIG. 3(g) shows a transmitter 20 having 80% of the orifice opening blocked to limit energy transmission through beam passage 74'. Preferably, the 20% area of beam passage 74' is situated above an x-axis 73 of the transmitter 20. The beam control of FIG. 3(g) transmits energy at approximately a 2° radiation angle to create a more focused and desirable radiation pattern on a container wall, as shown if FIG. 3(h). Specifically, the focused radiation patterns 76', 78', and 80', as produced by transmitters TX3, TX2, and TX1, respectively, provide a more narrow and wider radiation pattern which monitors a larger area along the x-axis to provide better resolution. Additionally, the trailing edge of energy that travels down the side wall of the container 16 to the container bottom, as shown in FIGS. 3(c) and 3(e), is essentially minimized. The lens of the transmitter, or the orifice, can be blocked by either drilling or machining an orifice as required, or it has also been found that the use of a decal partly opaque and partly clear functions equivalently with a lower cost. Additionally, one skilled in the art will recognize the equivalent application of these enhancements work effectively on the receivers, as well as the transmitters.

Figure 4:
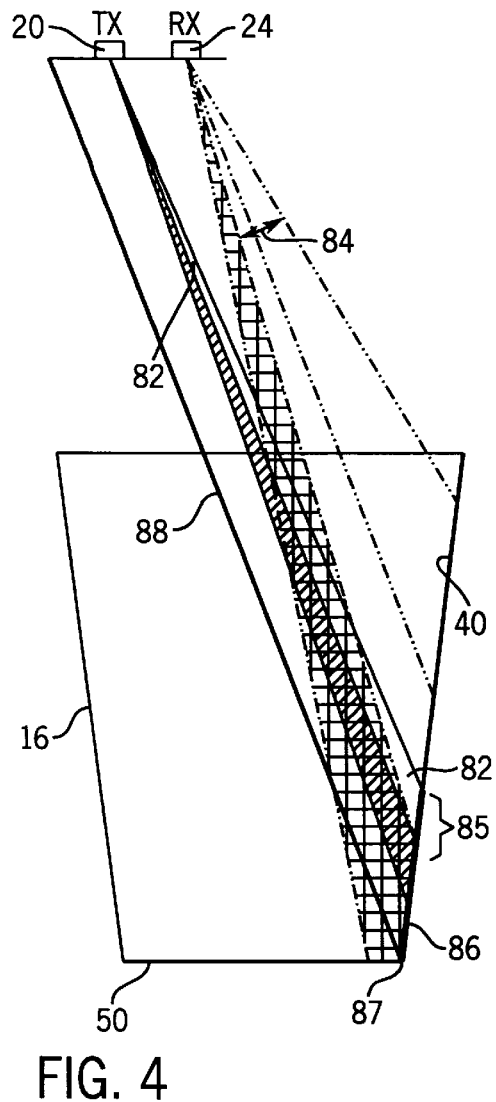
FIGS. 4–8 show side elevation views of a container in place within a container station under a transmitter and receiver pair according to the present invention with various product fill levels and showing the radiation pattern from the transmitter and the viewing angle of the receiver in phantom.

FIG. 4 shows the overall transmitted pattern resulting from a transmitter 20 focused according to FIG. 3(c) and a receiver 24 focused according to FIG. 3(b). In other words, the transmitter and receiver each have an orifice control covering approximately one-half of the orifice opening. A container 16 is positioned generally in a container station under exemplary transmitter 20 and receiver 24. Transmitted energy 82 from transmitter 20 is transmitted to a target area 85 on interior wall 40 wherein a portion of the-transmitted energy is reflected directly back to the receiver 24 within a preferred viewing angle 84 as dictated by the aforementioned transmitter/receiver orifice control. The signal received by the receiver 24 within the preferred viewing angle 84 is used to determine the presence of a container 16 and the fill level in the container before product dispensing is commenced. As depicted in FIG. 4, the majority of transmitted energy 86 is deflected downwardly toward the bottom 50 of container 16. This energy 86 is accumulated along the interior wall 40 and reflected outwardly once it reaches the hot spot 87 at the bottom 50 of container 16. The majority of the transmitted energy 86 is reflected on a displaced path 88 outside the preferred viewing angle 84 of receiver 24. However, a relatively small portion of the transmitted energy 82 will be received within the preferred viewing angle 84 of receiver 24. The receiver 24 then senses the relatively small amount of energy that is reflected directly from the interior wall 40 together with the small additional amount of energy reflected from the hot spot 87 at the container bottom 50. Differentiation can then be accomplished in control logic to identify the existence of a bottom 50 in container 16 located within the preferred viewing angle 84 of receiver 24. In this manner, the presence of a container 16 is first detected and secondly, it can be confirmed that the container does indeed have a bottom such that the system cannot be fooled into activating a dispenser by an open cylindrical sleeve or a flat piece of paper or cardboard. In a preferred embodiment, the transmitter 20 is focused to radiate energy within a pattern having a radiation angle of approximately 2° and the viewing angle of the receiver is controlled to approximately 10°, as measured from a center of the radiation pattern and viewing angle, respectively.

Figure 5:
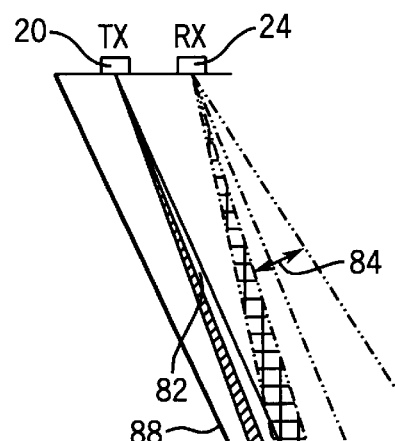

FIG. 5 shows the arrangement of FIG. 4, but where container 16 is partially filled with dispensed product 18 to a first product level 90. As in FIG. 4, FIG. 5 demonstrates where the transmitted energy 82 from transmitter 20 engages the interior wall 40 of container 16 such that a fraction of the energy is reflected directly toward and into the preferred viewing angle 84 of receiver 24, which is then used to determine the fill level 90 by control logic which will later be described in more detail. The majority of the transmitted energy 86 is deflected downwardly and reflected outwardly on the displace path 88 by the first product level 90, and away from the preferred viewing angle 84 of receiver 24. A collection point 92, or hot spot, is formed between the interior wall 40 and the product level 90. This collection point 92 deflects the majority of transmitted energy 86 and reflects this energy along the displaced path 88 away from receiver 24. The target area 85 of the interior wall 40 of container 16 receiving transmitted energy 82 directly, reflects a small portion of the transmitted energy due to irregularities in the surface directly back to receiver 24. This signal, monitored by receiver 24, is slightly weaker than that described with reference to FIG. 4 because of the reduced contact surface of the wall 40 due to the fill level 90. The signal is processed by the control logic and indicates that the container 16 is filling with dispensed product and the dispensed product is occupying at least a portion of the exposed target area 85.

Figure 6:
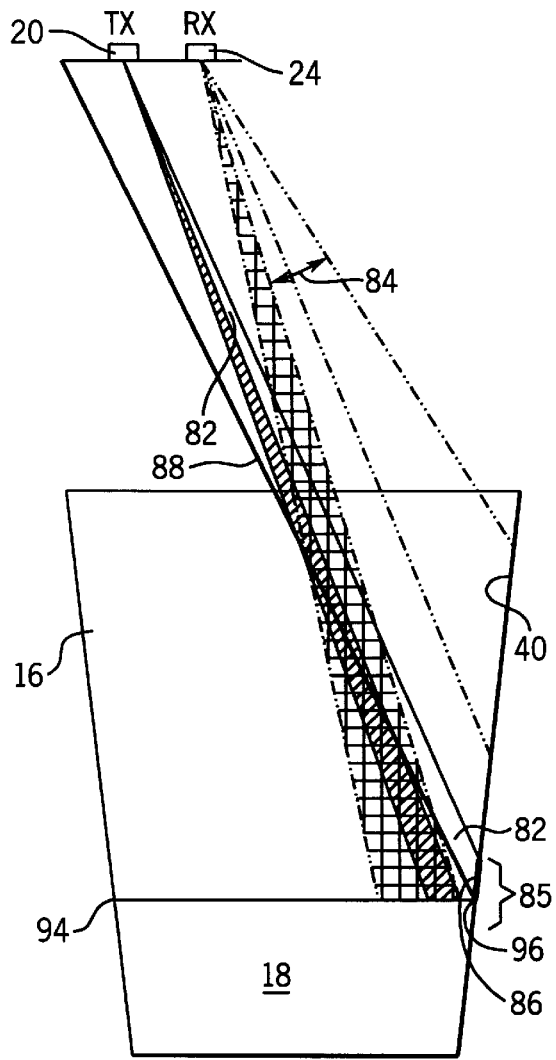

FIG. 6 is similar to FIG. 5, but with a dispensed product 18 at a second product level 94 intersecting the target area 85 at a higher level indicated by collection point 96. Again, while some of the energy is reflected directly back into the preferred viewing angle 84 of the receiver 26, the majority of the transmitted energy 86 is deflected downwardly to the collection point 96 formed by the product level 94 and the container wall 40 and is reflected outwardly along displaced path 88 such that it cannot be detected by receiver 24. The signal received in receiver 24 would be a slightly weaker signal than that of FIG. 5 because of the increasing fill level 94 and the reduced exposure of target area 85.

Figure 7:
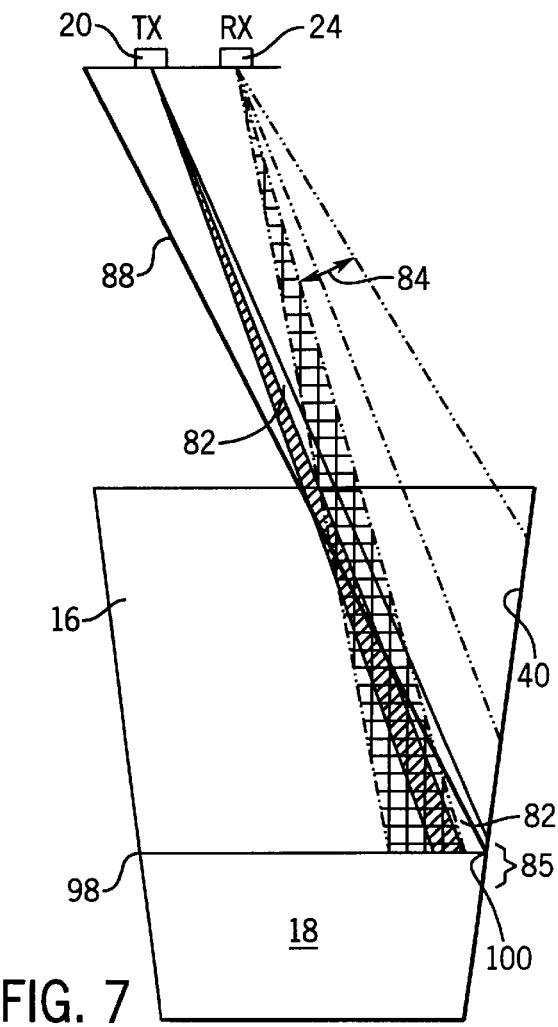

FIG. 7 is similar to FIGS. 5 and 6, but now with the dispensed product 18 at a third product level 98, greater than the second product level 94 of FIG. 6. The majority of transmitted energy 82 is deflected into collection point 100 formed by the interior side wall 40 and the third product level 98. Most of the energy is returned along the displaced path 88 outside of the preferred viewing angle 84 of receiver 24. A much smaller amount of energy is reflected directly back to receiver 24 as that of FIG. 6, thereby indicating that the product is well within the target area 85. As product 18 continues to rise, the signal received directly from the container wall 40 within the preferred viewing angle 84 diminishes until the product level surpasses the target area 85 and a next transmitter and receiver pair continue the monitoring dispensing process as the product level rises along the inside of the container 16. The rate at which the product 18 is dispensed into the container 16 is proportional to the rate of change in the return signal received within the preferred viewing angle 84 of receiver 24, and is a direct indication of the rate of change in the product level. This rate of change is herein referred to as rate detection and will be described in further detail with reference to FIGS. 15–24.

Figure 8:
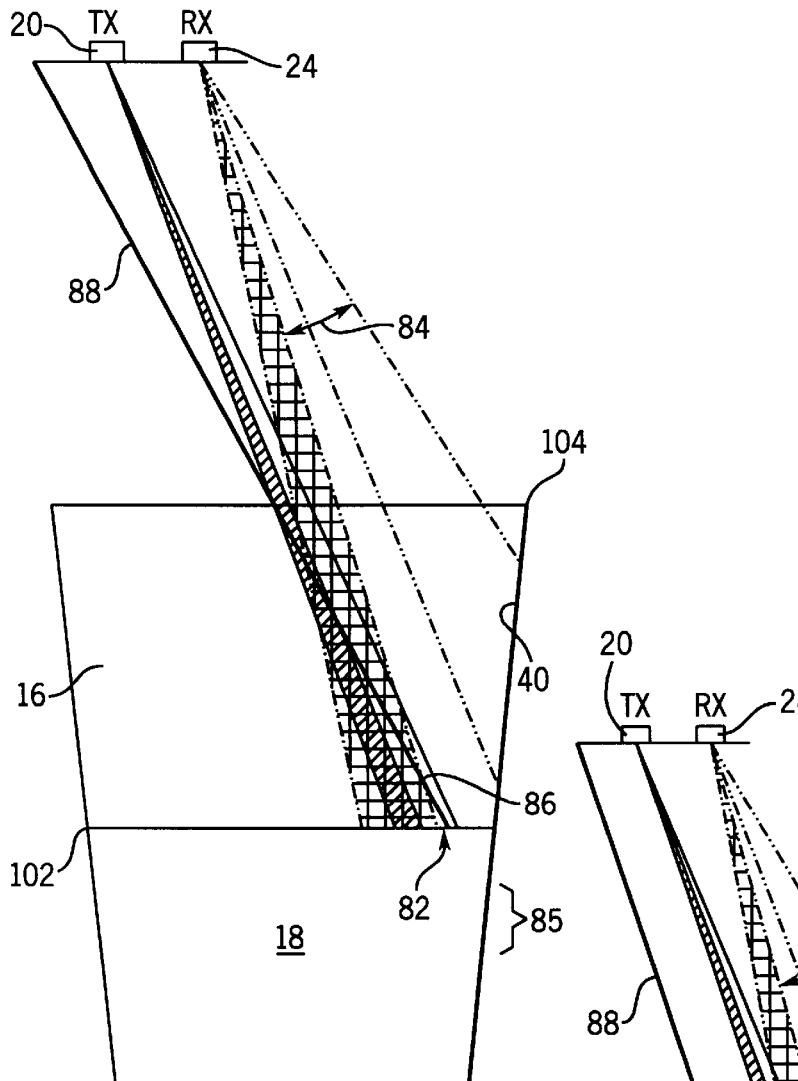

FIG. 8 shows yet a fourth product level 102 in which the target area 85 is completely submersed in dispensed product 18, and wherein none of the transmitted energy 82 is reaching the interior wall 40 of the container 16. The majority of the transmitted energy 86 is reflected off the surface of the dispensed product 18 and reflected along the displaced path 88 outside the preferred viewing angle 84 of the receiver 24. Extremely little energy is received within the preferred viewing angle 84 and detected by receiver 24, indicating that the product level 102 has now exceeded the target area 85. This minimal signal, when used alone, and positioned near the lip 104 of container 16, can indicate a completely full container. However, when this same signal is employed with additional similarly situated transmitters and receivers having variously positioned target areas on wall 40 of the container 16, the signal is used to determine the relative fill status or fill rate in the container.

FIG. 9 shows another embodiment of the present invention in which a visually clear and empty container 106 is placed against a positioning stop 108 such that the clear container 106 is correctly positioned under transmitter 20 and receiver 24. With such a clear container 106, the majority of transmitted energy 82 from transmitter 20 passes through the clear container 106 and reaches a target area 110 of positioning stop 108. A minimal amount of energy is reflected off the interior wall 112 of the clear container 106. Because of the orientation of the target area 110, the majority of the transmitted energy 82 that reaches the target 110, is reflected into the preferred viewing angle 84 of the receiver 24. The remaining transmitted energy is deflected along path 114 and reflected outside of the preferred viewing angle 84 by collection point 116 along displaced path 88. This energy is typically relatively small in comparison to the signal returned to the receiver 24 from the target area 110 in this application.

Referring to FIG. 9(*a*), a top view of a clear container 106 is shown positioned against the positioning stop 108 such that the bottom 118 of the container 106 is in contact with an arcing outer perimeter 120 of the positioning stop 108 to receive and position cup 106 under a dispensing spigot (not shown) and under the transmitter 20 and receiver 24 of FIG. 9. In this manner, the present invention overcomes an obvious limitation to using infrared technology to determine container position and product level detection for clear containers.

FIG. 10 shows the embodiment of FIG. 9 having dispensed product 18 in a clear container 106 to a first product level of 122. The transmitted energy 82 from transmitter 20 is directed to the interior wall 112 of container 106 with a majority of the transmitted energy passing through container 106 to the target area 110. A minimal amount of energy is initially reflected off the interior wall 112 and directed into the preferred viewing angle 84 of receiver 24 to indicate the presence of a clear container. The majority of transmitted energy 124 is reflected off the target area 110 and directed within the preferred viewing angle 84 of receiver 24 and an additional portion is reflected into the preferred viewing angle 84 from the collection point 116. The signal received from the collection point 116 formed by the intersection of the product level 122 and the sidewall 112 reflects a significant amount of added signal, but this signal is relatively small compared to the signal returned from the target area 110. This returned signal is less than without a container present, further indicating container presence. At a product level 122, the product 18 is essentially blocking approximately 50% of the transmitted energy 82 that could possibly reach the target area 110, thereby reducing the returned energy by approximately 50% as compared to FIG. 9. As the product level increases, the return signal is decreased, which is used as an indication of the rate of change in the dispensed product 18 and is later used for the rate detection.

FIG. 11 shows the arrangement of FIG. 10, but now with a product 18 at a product level 126. At such a product level, virtually no transmitted energy reaches the target area 110 for most products with a clear container 106 and little or no energy is returned within the preferred viewing angle 84 of receiver 24. The overall signal strength returned to receiver 24 is significantly reduced as compared to that of FIG. 10 and indicates that the product level is now blocking the target area 110. This indication when used alone, and positioned near the lip 128 of container 106, can indicate a full container and initiate a stop dispensing signal to the dispenser. However, when this signal is employed in conjunction with other similarly situated transmitters and receivers having corresponding target areas variously positioned on wall 112, it is used to determine the fill status and/or the fill rate of the product 18 for a variety of container sizes.

Figure 12A:
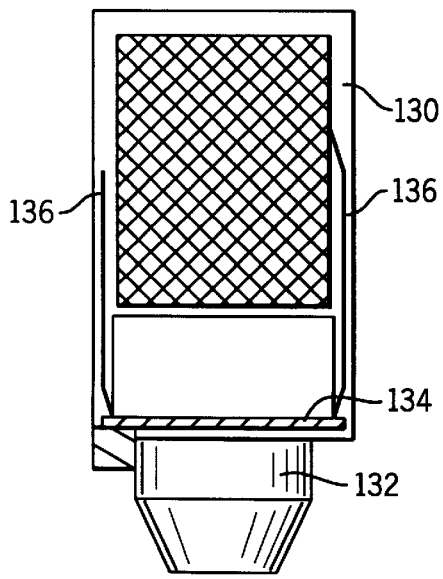
FIG. 12(a) shows a front elevation view of a dispenser incorporating the present invention.
Figure 12B:
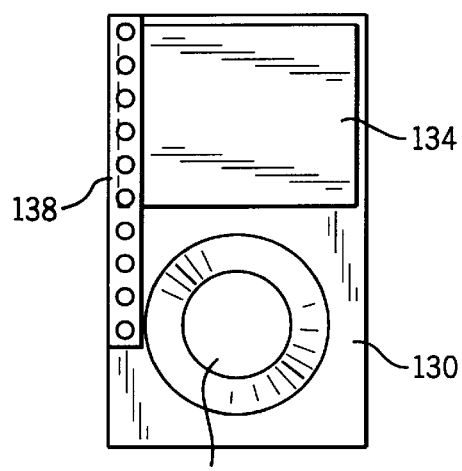
FIG. 12(b) shows a bottom view of the dispensing valve of FIG. 12(a).

The packaging of the control and sensor assembly of the present invention may take on a number of configurations, including, but not limited to, self contained within the dispenser valve, an appendage to the dispenser valve, or as a stand alone unit mounted near the dispenser valve. In most applications the assembly would be an encapsulated module for environmental protection. FIG. 12(a) and 12(b) show a preferred dispensing valve assembly 130 having a dispenser nozzle 132 incorporating a printed circuit board 134 according to the present invention and adapted with transmitters and receivers for container detection and fill control. This embodiment is readily adaptable to new dispensing valves and can also be adapted for the replacement market to provide the automatic container detection and fill control device of the present invention into existing dispensing valves. A power supply 136 for the printed circuit board 134 is connected to the same type of power plug that is used in the industry for dispensers employing push button switches or lever actuated switches for easy retrofit. FIG. 12(b) shows a bottom view of the dispensing valve 130 mounted with an array of transmitters and receivers in a mounting block 138 orientated toward a container station to detect the presence and/or absence of a container and detect the fill control of dispensed product into the container and automatically control dispensing from the dispensing nozzle 132.

Figure 13A:
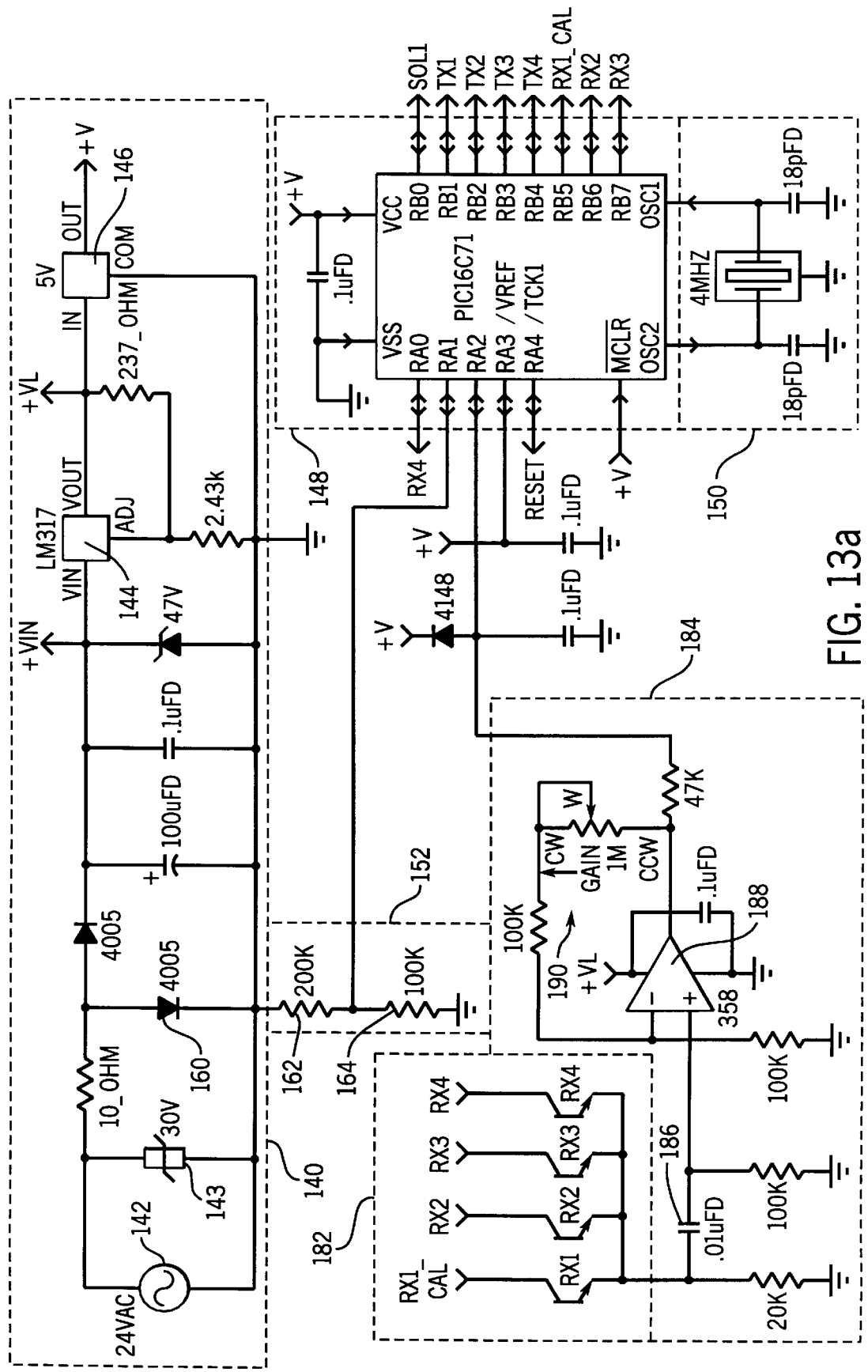
FIGS. 13(a) and 13(b) show a circuit schematic of the control system for a preferred embodiment of the present invention.
Figure 13B:
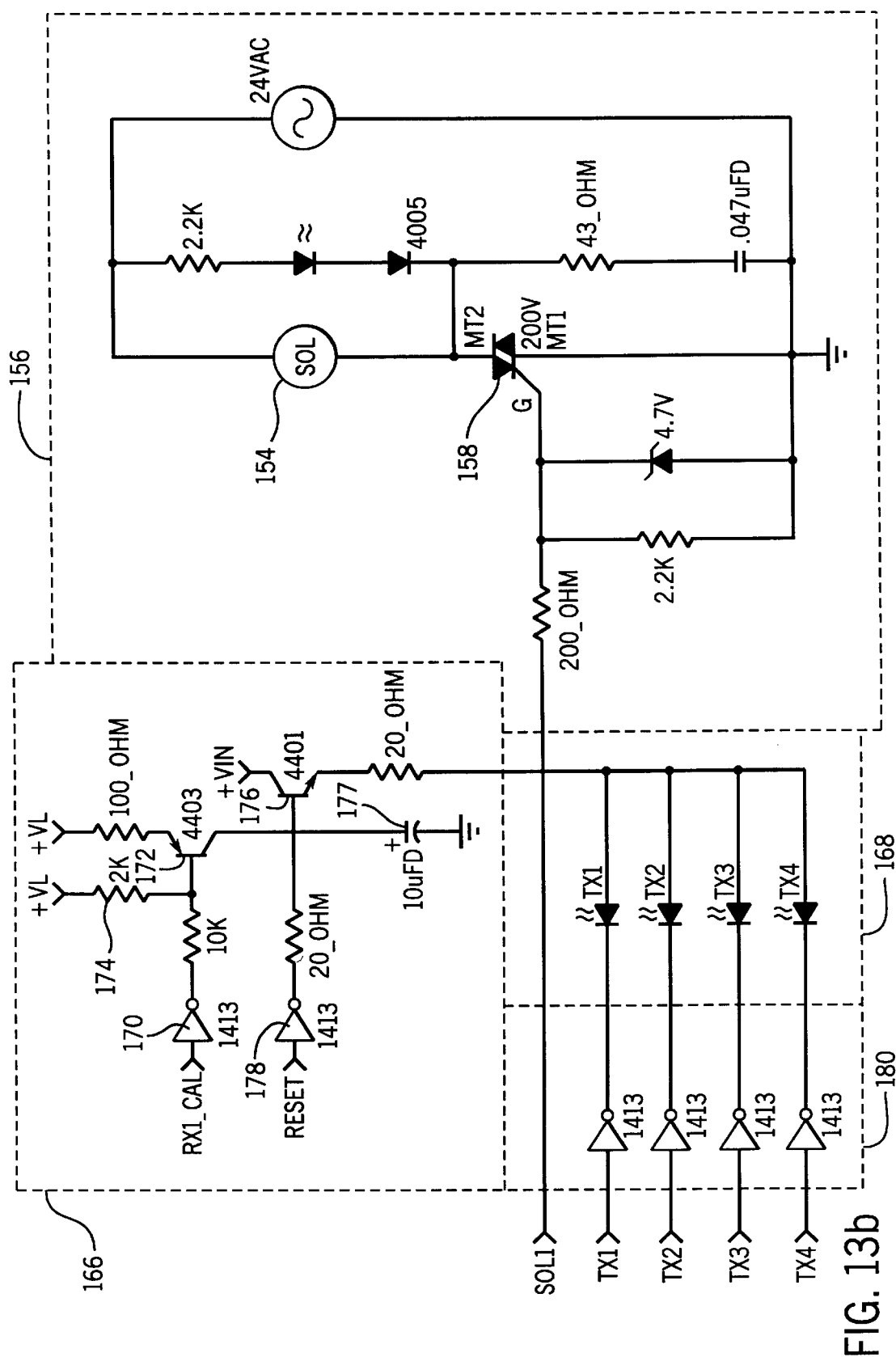

FIG. 13(a) and 13(b) show a preferred circuit schematic of the control for the present invention as depicted on the printed circuit board 134 of FIG. 12. A power supply 140 is shown connected to a power source 142 which will usually be either a conventional 120 VRMS, 24 VRMS, or 18 to 40 VDC in a dispenser application. Other voltages could be readily adapted for with minor changes to the power supply circuitry as will be apparent by those skilled in the art. One of the output voltages of the power supply 140 is a +VIN output voltage that provides a filtered half-wave 24 VAC supply used for a programmable drive voltage to an automatic calibration logic circuit. A one amp adjustable voltage regulator 144 provides a +VL supply primarily for a power supply to the op-amp. A 5 volt regulator 146 supplies a 5 volt +V digital voltage supply for the logic components.

A varistor 143 is connected across the power source 142 to remove voltage spikes exceeding 30 volts. The +VL output is an analog power supply of approximately 13.75 volts for driving an op-amp in the amplifier section and in the ramp generator for a greater voltage range in the automatic calibration scheme.

A microcontroller 148 with a built in A/D converter provides 256 increments in receiver resolution. The microcontroller 148 is programed with firmware according to the flow charts of FIGS. 14–24 and is connected to a crystal oscillator 150 to generate precision timing pulses for precise microcontroller operation. The microcontroller 148 is also connected to a synchronous circuit 152 which synchronizes the microcontroller 148 to the line voltage 142 to minimize the effect of interference signals on the line voltage that may simulate received light signals. Synchronous circuit 152 is designed to prevent switching of an output solenoid 154 in the output stage 156, FIG. 13(b), at undesired times in the AC frequency cycle which is designed to extend the life of solenoid 154 and output SCR 158. In the preferred embodiment, a switching output is synced in the microcontroller 148 at the zero-crossing point of the AC cycle via diode 160 and voltage dividing resisters 162 and 164.

A ramp generator circuit 166, FIG. 13(b), is connected between a transmitter section 168 and the calibrate and reset outputs of the microcontroller 148 to generate a variable output of the transmitters in transmitter section 168 as required for automatic calibration as will be further described with reference to FIGS. 14–21. The ramp generator 166 has a first inverter 170 connected to a first transistor 172 with a pull up resister 174 therebetween. Transistor 172 activates a second transistor 176 as long as a reset signal is not sent from microcontroller 148 via inverter 178. The second transistor 176 provides the non-regulated DC +VIN signal to the transmitters TX in the transmitters section 168 for a time determined by the automatic calibration scheme set forth in the flowchart of FIG. 21 and in accordance with the graph of FIG. 14. Other appropriate resistance and filtration is provided as is customary. The ramp generator 166 also includes a capacitor 177 connected between the base of transistor 176 and ground which provides a slow ramping up voltage at the emitter of transistor 176 for the inputs to the transmitters TX1–TX4 of the transmitter section 168.

A transmitter driver section 180 completes the circuit between the transmitters 168 and the microcontroller 148 such that the proper ramping voltage can be supplied to the transmitters 168. In this manner, the ramp generator 166 can be reset by the microcontroller 148 and stopped at a fixed value of driver voltage for each beam during a transmitting pulse. In preferred embodiment, the transmitters TX in the transmitter section 168 are infrared transmitting diodes with a 2° radiation angle. A corresponding set of receivers RX in receiver section 182 receive energy signals as reflected from a container as previously described with reference to FIGS. 1–10. Preferably, the receivers RX are infrared sensing transistors that receive and detect the infrared transmissions from the transmitters TX. A receiver amplifier section 184 is coupled to the receivers RX1–RX4 via a single capacitor 186. The receiver amplifier section 184 includes an operational amplifier 188 having an adjustable gain control 190 to increase the signal strength to a level required by the A/D converter in the microcontroller 148 for maximum resolution. Alternatively, amplifier 188 could be eliminated if higher gain receivers are used.

An output section 156 includes a driving triac 158, a dispenser activation solenoid 154 driven by the 24 VAC power source, conventionally connected. As is understood by those skilled in the art, the SCR or triac 158 in the output section 156 would require a higher voltage rating for 120 volt applications, or alternatively, the triac would be replaced by a transistor for a DC application, or a relay for both AC and DC applications. The present description shows a 24 volt AC application for illustrative purposes only.

As is well known, when energy is transmitted, it losses strength as a function of the distance traveled. In this application, the energy is directed at the interior wall of the container and only a small portion is reflected back to the receiver. An automatic gain control is implemented with the ramp generator 166 and microcontroller 148 according to the flowchart of FIG. 22 and is designed to allow the system to operate with the highest amount of resolution possible to compensate for the relative small charge in returned signal. The control system first transmits a base line power value until a container is recognized in position and is ready for product to be dispensed. Before dispensing begins, the control adjusts the energy transmitted on a per transmitter basis until the energy returned and recorded at the associated receiver, is equal to approximately 95% of full scale for that receiver circuit. This self-calibration allows the signal returned from the walls of the container to be divided into a maximum number of segments to provide the greatest amount of resolution possible for the individual characteristics of the receiver circuit employed. This calibration also compensates for the relative strength of the individual transmitters, the selectivity of each receiver, the texture of the container walls, and for variations in container position. The system is then able to operate over a wider range with better resolution for more thorough interrogation of the container for a fixed transmitter radiation pattern and receiver viewing angle.

Figure 14:
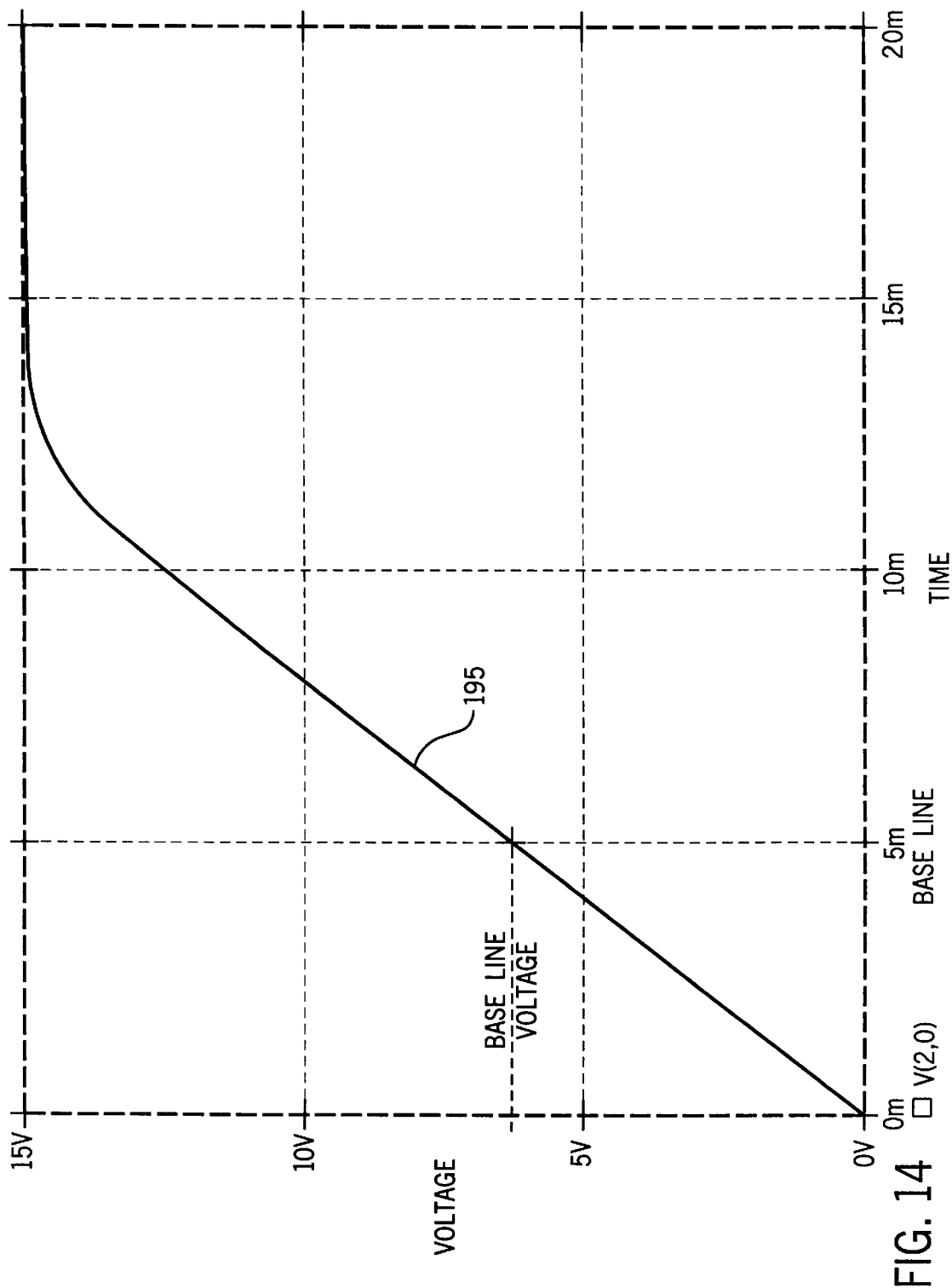
FIG. 14 is a graph showing voltage versus time for the output of a portion of the circuit of FIG. 13.

FIG. 14 is a graph of the output 195 of the automatic gain control achieved by the ramp generator 166 plotting time versus voltage. The base line voltage results from the ramp generator 166 being activated for its base time period, 5 ms. As is evident, the time that the ramp generator is switched on determines the energy power transmitted, thereby resulting in a variable strength signal as monitored by the receivers. This circuit provides the ability to obtain the maximum resolution for the system on a per dispense cycle to calibrate for each particular container and the characteristics of individual components. The algorithm described in FIG. 22 locates the place on the curve of FIG. 14 between the baseline voltage and a maximum voltage where the received signal is between 85% and 95% for the transmission voltage. In other words, during calibration when a container is first placed under the dispenser, the voltage is increased until the light returned reaches 95% of the maximum capabilities of the particular devices used in order to maximize the 256 counts in the A/D converter.

Figure 15:
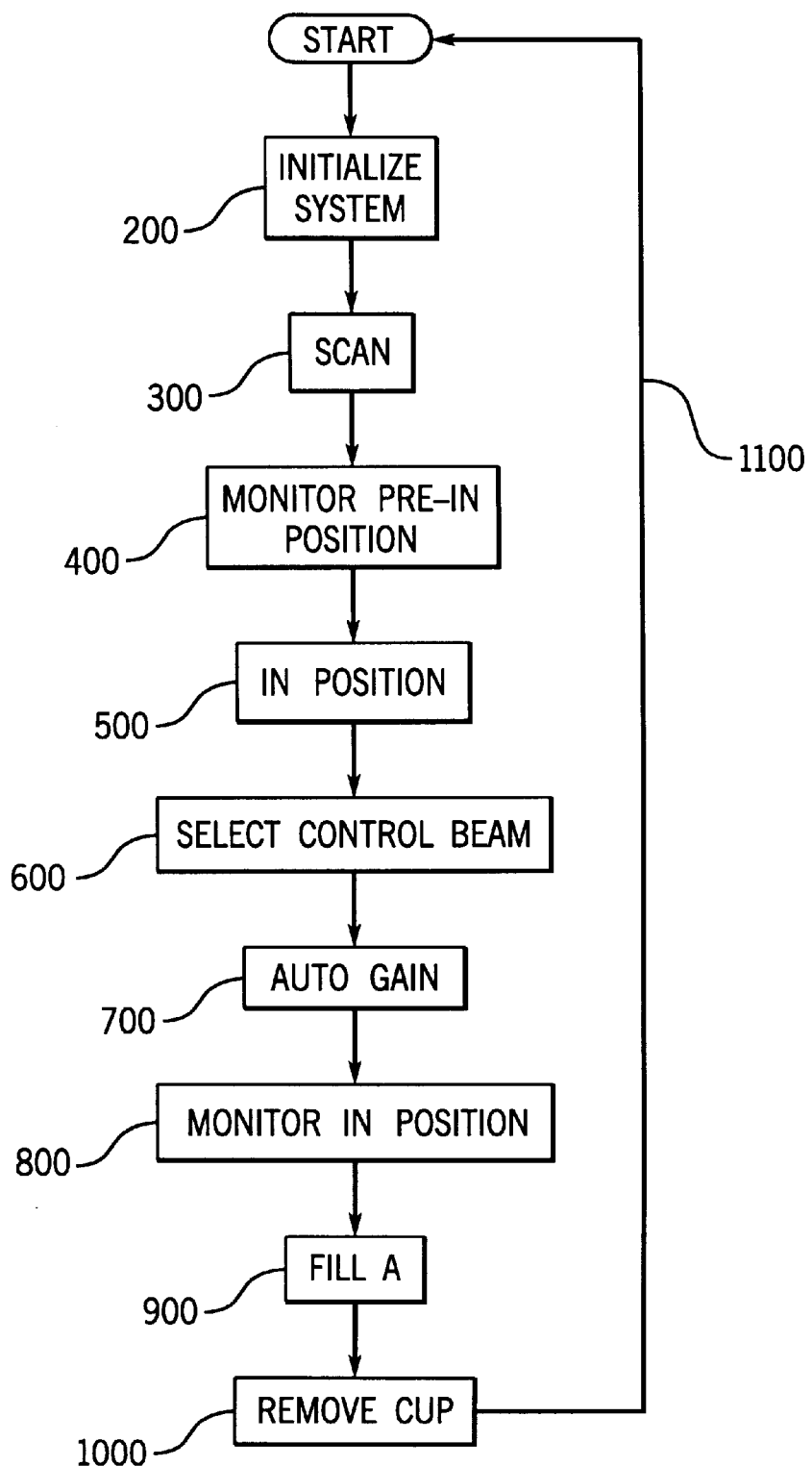
FIGS. 15–24 are flow charts for the software implemented in the circuit of FIG. 13.

FIG. 15 shows the overall system flow diagram for the control of the present invention. After a power up, as designated by a start command, a series of subroutines are executed, each described in detail with reference to FIGS. 16–24. After the initial start command, the system is initialized 200, a scan subroutine is run on all transmitter and receiver pairs 300, and the system monitors for the initial presence of a container 400. Once a container is detected, a positioning subroutine 500 is called to determine if the container is in the correct position, and afterward, a select control beam subroutine 600 determines how many transmitters and receivers are required for the particular container size that is in position. The automatic gain subroutine 700 is called for each transmitter and corresponding receiver to optimize the A/D converter, followed by an algorithm to monitor and ensure continued container presence. A fill algorithm 900 is then executed to initiate dispensing, monitor a fill level, and make necessary adjustments for any foaming of the dispensed product. Lastly, a remove cup subroutine 1000 is executed to ensure that the container is full and that the full container has been sufficiently removed to allow the introduction of an empty container wherein the overall main algorithm can begin again at another start command.

Figure 16:
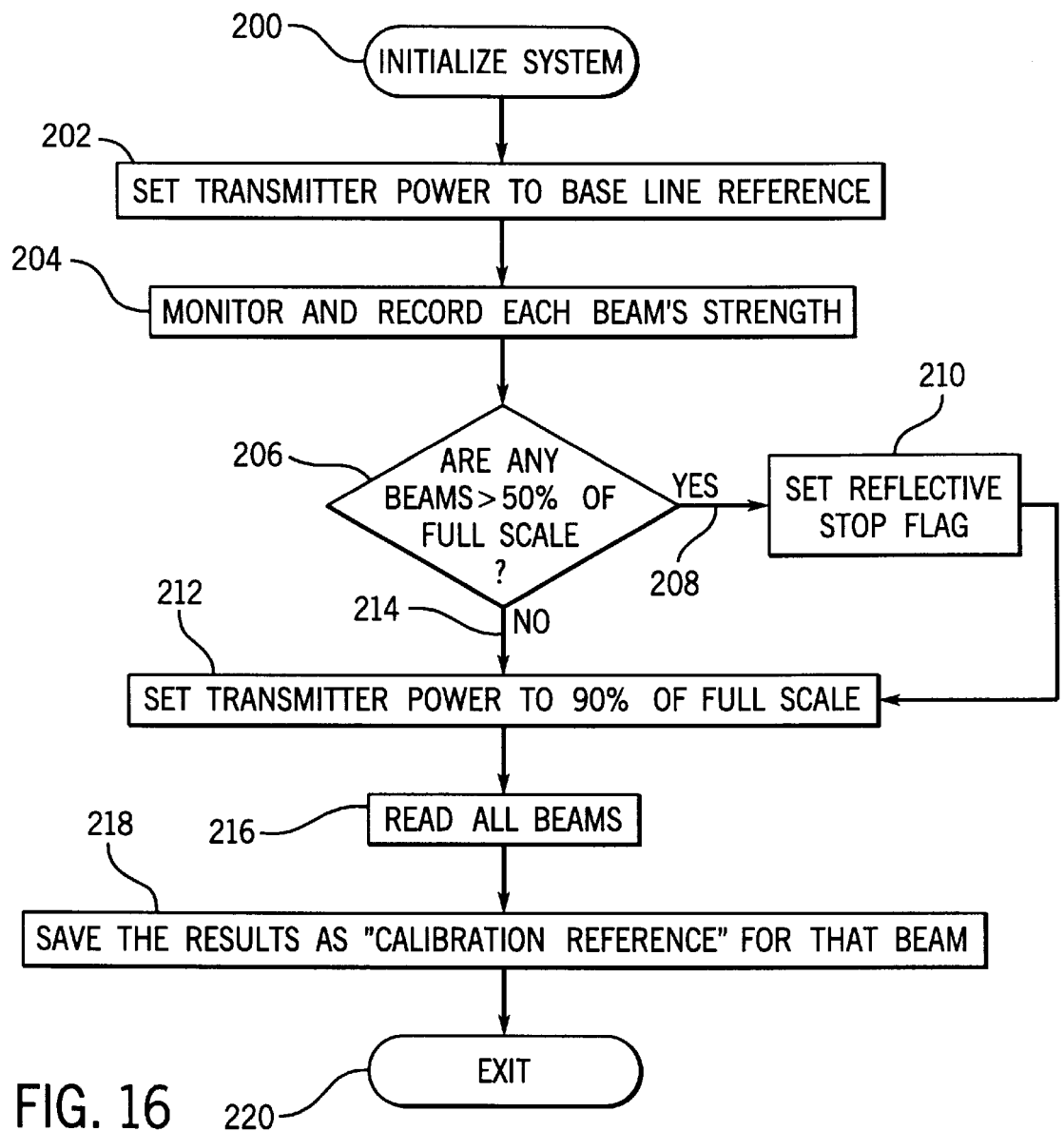

FIG. 16 shows a detail flow chart for the initialization algorithm 200 of FIG. 15. This subroutine is used to identify the existence of a reflective positioning stop 108 as shown in FIGS. 9–11, and to establish an ideal transmitter power and a base reference for each transmission. Once the initialization algorithm 200 is called, each of the transmitters are set to transmit at the baseline voltage 202 and the receivers are monitored to determine a relative strength of each received signal, which is then recorded 204. Each of the recorded received signal is compared to a constant, and preferably, that constant is one-half of the full scale possible at 206. If any of the receivers are receiving a signal that is greater than one-half of the full scale, then a reflective stop flag is set 210, indicating that a reflective positioning stop 108, FIG. 9, is present. Referring back to FIG. 16, the transmission power is then set to 90% of full scale at 212. Conversely, if the recorded value is less than 50% of full scale 214 from all of the receivers, then there is no positioning stop, the stop flag is not set, and the transmission power is set to 90% of full scale at 212. With each of the transmitters transmitting at 90% of full scale, all the receivers are monitored 216 and the results are saved as a Calibration Reference for each particular receiver 218 which then completes 220 the initialization subroutine 200.

Figure 17:
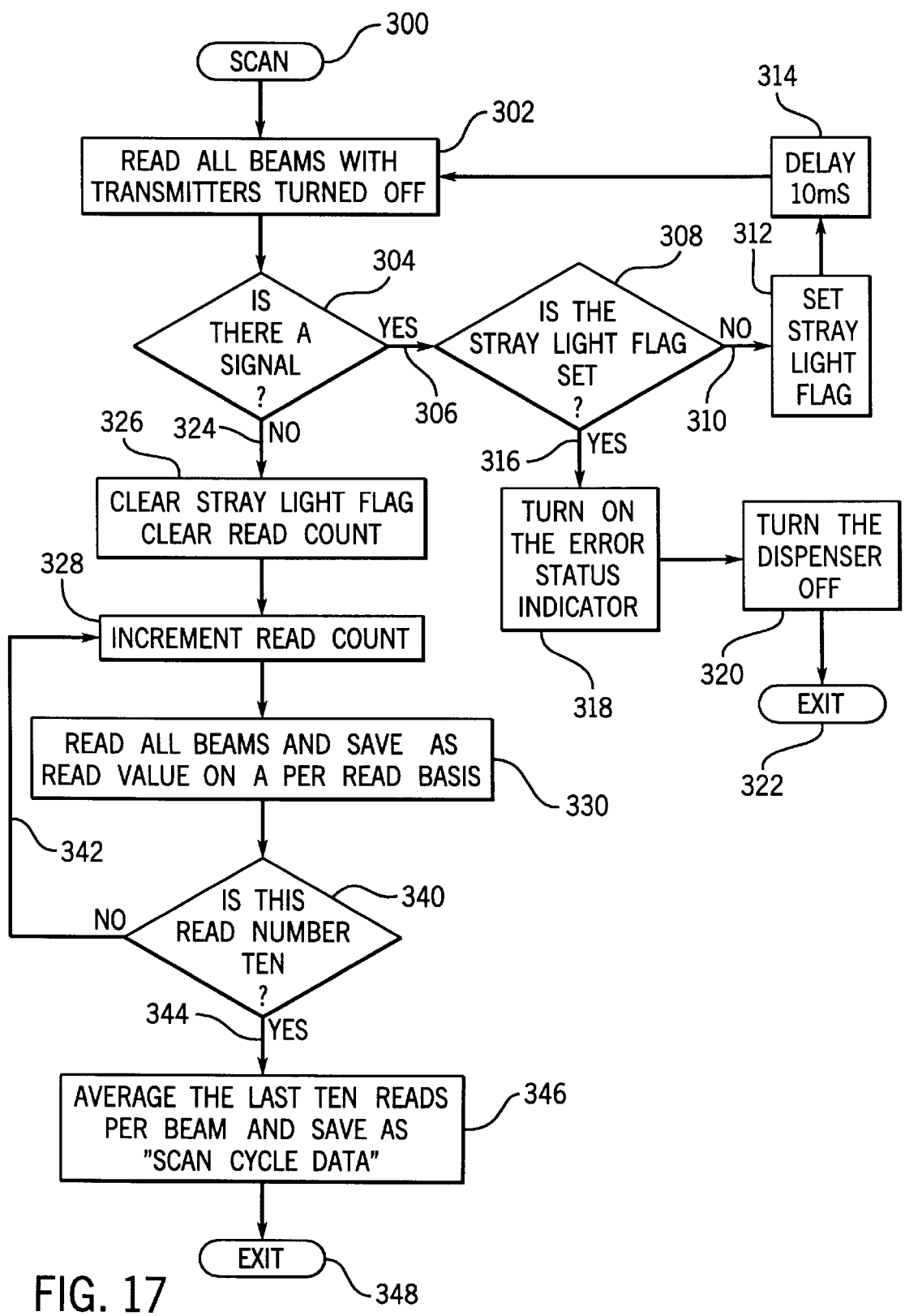

Upon leaving the initialization algorithm 200, the system calls the scan subroutine 300, FIG. 17. Each of the receivers are monitored during periods when no power is supplied to the transmitters 302 to monitor for stray light. Each receiver is checked to see if a signal is received 304 and if so 306, the Stray Light flag is checked 308. If there is a signal 306 and the flag has not been set 310, the Stray Light flag is set 312, a time delay is initiated 314, and each of the receivers is monitored again 302. If a signal is still present 306, and the Stray Light flag is set 316, an error indicator is set at 318 and a signal is sent to the dispenser to ensure the dispenser is off 320 and the system returns 322 to the main algorithm of FIG. 15. If no stray signals are received when the transmitters are turned off 324, the Stray Light flag and a Read Count are reset 326, the Read Count is incremented by one 328, and after each transmitter is powered up each of the receivers are monitored and the value is saved as a Read Value 330 for each of the individual transmissions and receptions until a predetermined number, preferably 10, of the Read Values are saved at 340, 342. After 10 Read Values are stored for each transmitter/receiver 344, the values are then averaged per transmitter/receiver 346 and each is saved. After which the system exits the scan cycle at 348 and continues to a Pre-In Position subroutine 400.

Figure 18:
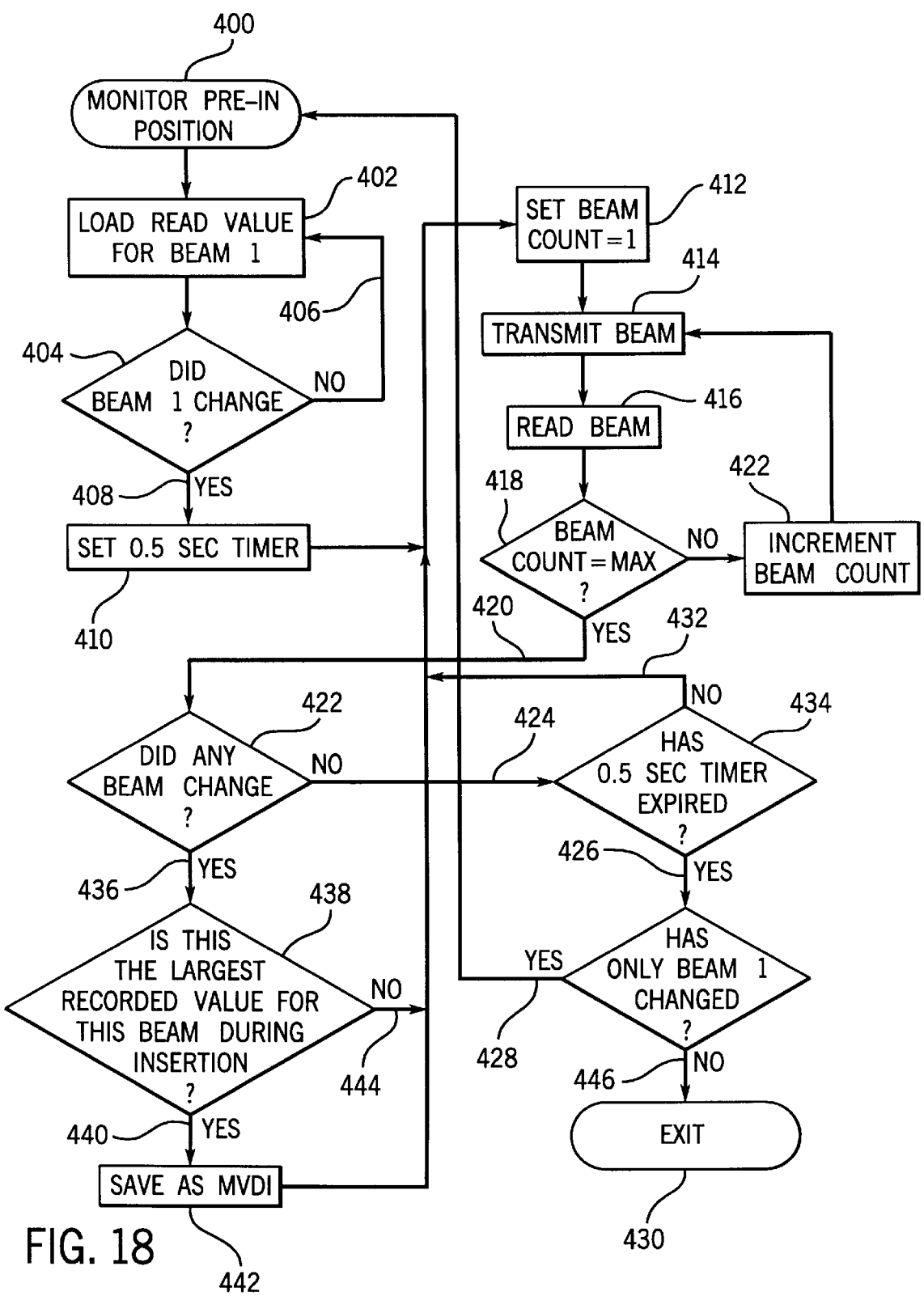

FIG. 18 shows a subroutine used to monitor the position of a container as it enters under a dispenser and determines a maximum value for the signals received in each receiver during the insertion of the container. These reference signals are later used to compare relative beam changes during the filling process. The Monitor Pre-In Position algorithm 400 first includes loading the Read Value for the first receiver 402 and continually checking to see if it changes 404, 406 during further transmissions from the first transmitter. When the first receiver senses a change 408, a timer is enabled at 410 to see if another received signal changes to indicate the presence of a container during the timer time period. Once the timer is enabled 410, a counter is initialized 412 and each transmitter is energized 414 and its corresponding receiver read 416 until a maximum Beam Count is reached 418, 420. Otherwise, the Beam Count is advanced to the next Beam Count 422 wherein transmit and read commands are repeated for each transmitter and receiver. After each has been read at least once 420, each received signal is compared 422 to the averaged Scan Cycle Data as determined at step 346, FIG. 17. If no beam changed at 424 and the timer has expired 426, then only the first beam changed wherein the system is returned 428 to the beginning of the algorithm 400. If timer 410 has not expired 432 as determined at 434, the system resets the Beam Count and continues to transmit 414 and read 416 each transmitter and receiver, respectively, until each receiver is read at least once 420 and a received signal has changed 422, 436. If the value for that received signal, which is indicative of the beam strength, is the largest recorded during this container insertion 440, that value is saved as the Maximum Value During Insertion (MVDI)442 for that particular receiver. If it is not the largest value 444, then another transmission and reception cycle is repeated. This process continues until each and every receiver has a Maximum Value or there are no further changes in the received signals at 422, 424 and the timer has expired at 434, 426, and more than the first receiver changed 446, at which time the Monitor Pre-In Position algorithm 400 is complete and the system exits 430 and continues to the In Position algorithm 500.

Figure 19:
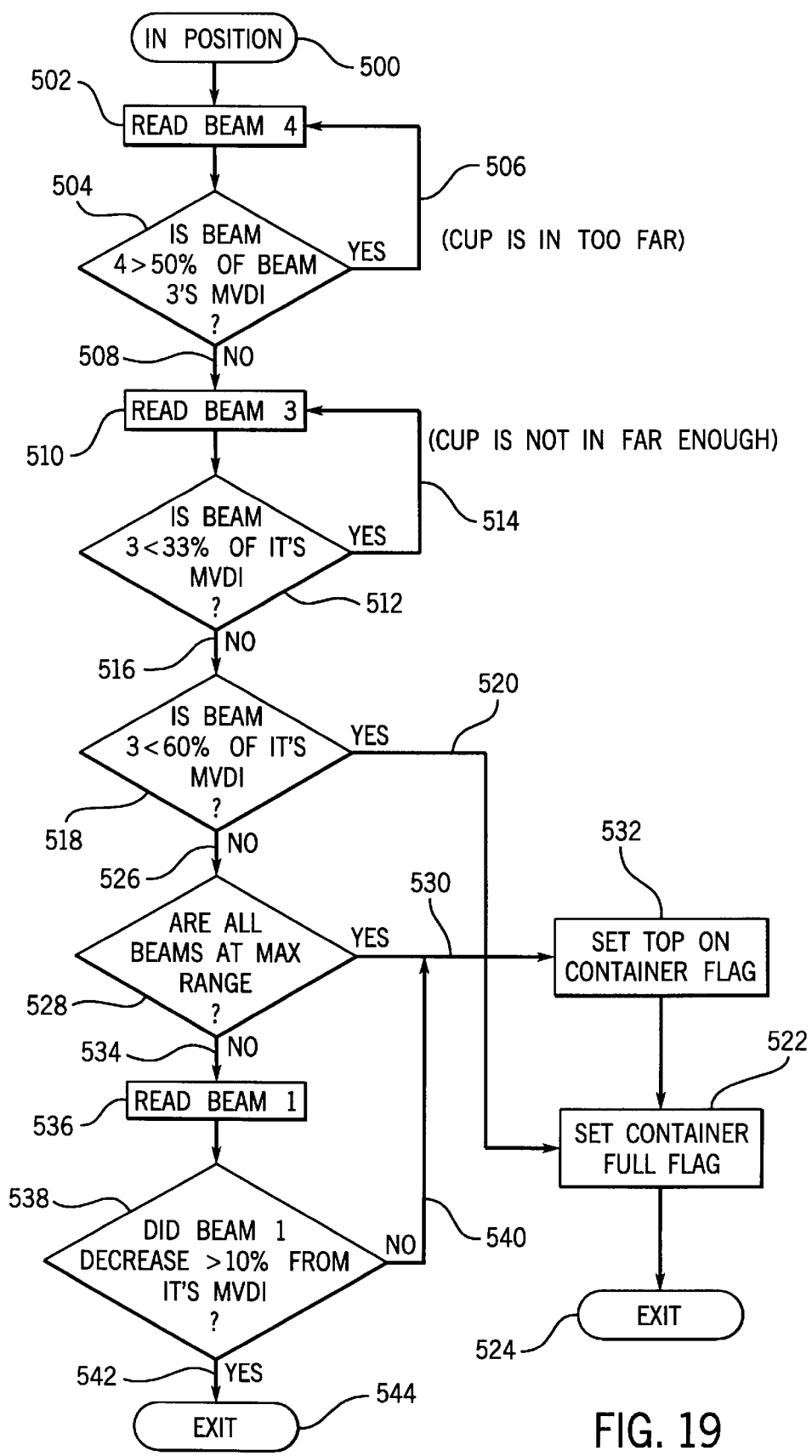

FIG. 19 shows the detailed flow of the In Position algorithm 500 of FIG. 15. The In Position subroutine is used to determine the initial fill status of a properly positional container, the position of the container within the overall beam pattern, and identify containers that either have a lid or cover on and/or may already be filled. In a four beam system, where there are four transmitters and receivers for container detection and fill control, as is in the preferred embodiment, the last, or fourth beam is read 502 and compared to one-half of the third beams MVDI 504. As long as the fourth beam is more than one-half the third beams MVDI 506, the container is in too far and the system cycles between transmitting and reading beam four 502 and comparing the value for beam four against beam three's MVDI 504. If the container is not in too far 508 as determined by the fourth beam being less than or equal to one-half the third beam's MVDI, then the third transmitter/receiver pair is transmitted and read 510 and the value is compared to one third of the previously recorded MVDI for beam three 512. As long as the third beam is less than one-third of its own MVDI 514, the container is not in far enough with respect to the dispensing spout, and the system cycles between transmitting and receiving beam three 510 and the comparison in 512. Once the container is correctly positioned 516, the third beam is again compared to its MVDI 518 and if it is less than 60% 520, indicates that the container is already full, and the container full flag is set 522. This ends the In Position algorithm 524.

Conversely, if beam 3 is not less than 60% of its own MVDI 518, 526, then all the received signals are compared to their own MVDIs 528, and if they are all at the maximum range 530, then a Top On Container flag is set 532 indicating that a cover is on the container and the Container Full flag is set 522. The system then exits at 524. Returning to the decision at 528, if all the beams are not at their maximum range 534 then after the first transmitter is energized and the first beam is read 536, the beam is compared to its original MVDI 538, and if beam one has not decreased by more than 10% 540, the Top On Container and Container Full flags are set 532, 522 and the system exits 524 the In Position subroutine 500. If the first beam did not decrease 542 as indicated in the decision block of 538, the system exits at 544 the In Position algorithm 500 and is ready to begin the Select Control Beam 600 subroutine.

Figure 20:
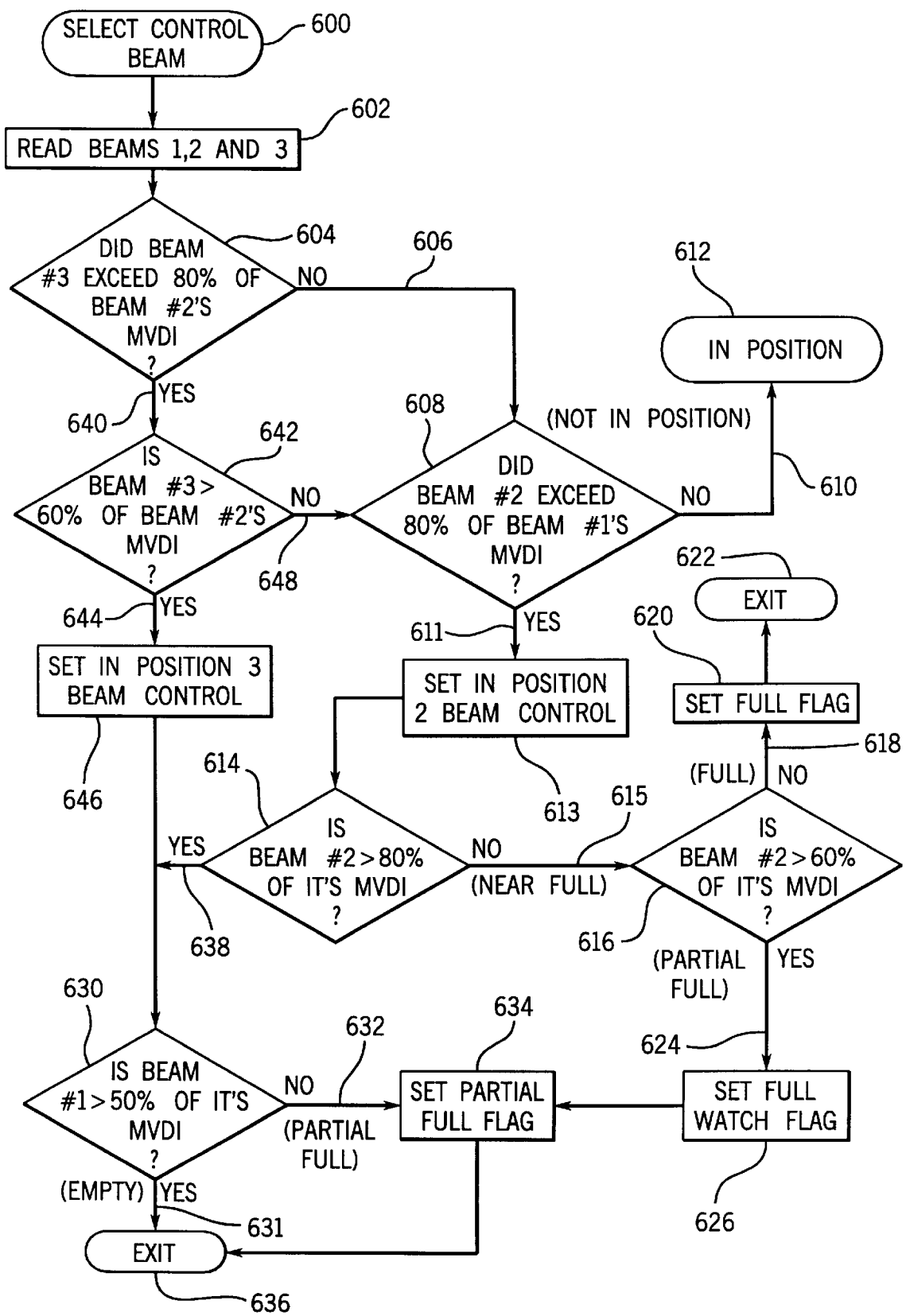

FIG. 20 shows the detail flow of the Select Control Beam algorithm 600 of FIG. 15. This subroutine is used to establish which one of the control beams and associated transmitter/receiver is to be used to determine the final fill level for the particular container size present, initialize a Fill Watch flag, and at the same time ensure that the container remains in position. After an initial transmission from the transmitters, the first three receivers are read 602 and a comparison is made between the value of the third beam and the MVDI of the second beam 604. If the value for the third beam does not exceed 80% of the second beams MVDI 606, the third beam is not reflecting off the interior wall of the container, meaning that the container present is smaller than the largest acceptable size. The value of the second beam is then compared to 80% of the first beam's MVDI 608, and if it does not exceed that 80% level 610, provides an indication that the container is not fully in position and additional time and monitoring is needed to determine whether the container is in position or removed. As a result, the system returns to the In Position algorithm 500 at step 612.

Conversely, if the second beam did exceed 80% of the first beams MVDI in decision 608 along path 611, then a two beam control is sufficient for the container present 613 because two of the beams are active. The container at this point may or may not have dispensed product therein. A comparison of the second beam value to its own MVDI 614 is used to determine any fill in the container. If the value of the second beam is not greater than 80% of its own MVDI 615, then the container is somewhere near a full level, but a further comparison of the second beam 616 is used to determine whether or not the container is filled. If the value of the second beam is not greater than 60% of its own MVDI 618, then the container is full, the Full flag is set 620 and the system is allowed to exit 622 the Select Control Beam algorithm 600. On the other hand, if the value of the second beam is greater than 60% of its own MVDI 624, the container is near full, but not quite filled completely and the Full Watch flag is set 626, the Partial Full Flag is set 634 and the system exits 636 this algorithm. Where the second beam value is greater than 80% of its MVDI in 614 along path 638 means that the container is either empty or not near a full level. Comparison 630 checks the strength of the first beam to determine the actual fill status. If the first beam is greater than 50% of its MVDI 631, the container is empty and the algorithm is complete 636. If not 632, it is partially full, the Partial Full flag is set 634, and the system exits 636 the Select Control Beam algorithm 600.

Returning to the decision at 604, if the third beam did exceed 80% of the second beams MVDI 640, and the third beam is greater than 60% of beam 2 MVDI 642, 644, then the system is set for a three beam control 646, and a determination estimate is made as to whether the container has any product therein 630. If it does 632, the partial Full flag is set 634 and the select control beam algorithm 600 is complete at 636. Otherwise, the container is empty 631 which completes the select control beam algorithm at 636. If however the third beam is not greater than 60% of the second beams MVDI at 642, 648, then either the container is not in position 610 or a smaller container is present and the system is set for a two beam control 613 as determined in decision 608 The remaining steps are as previously described.

Figure 21:
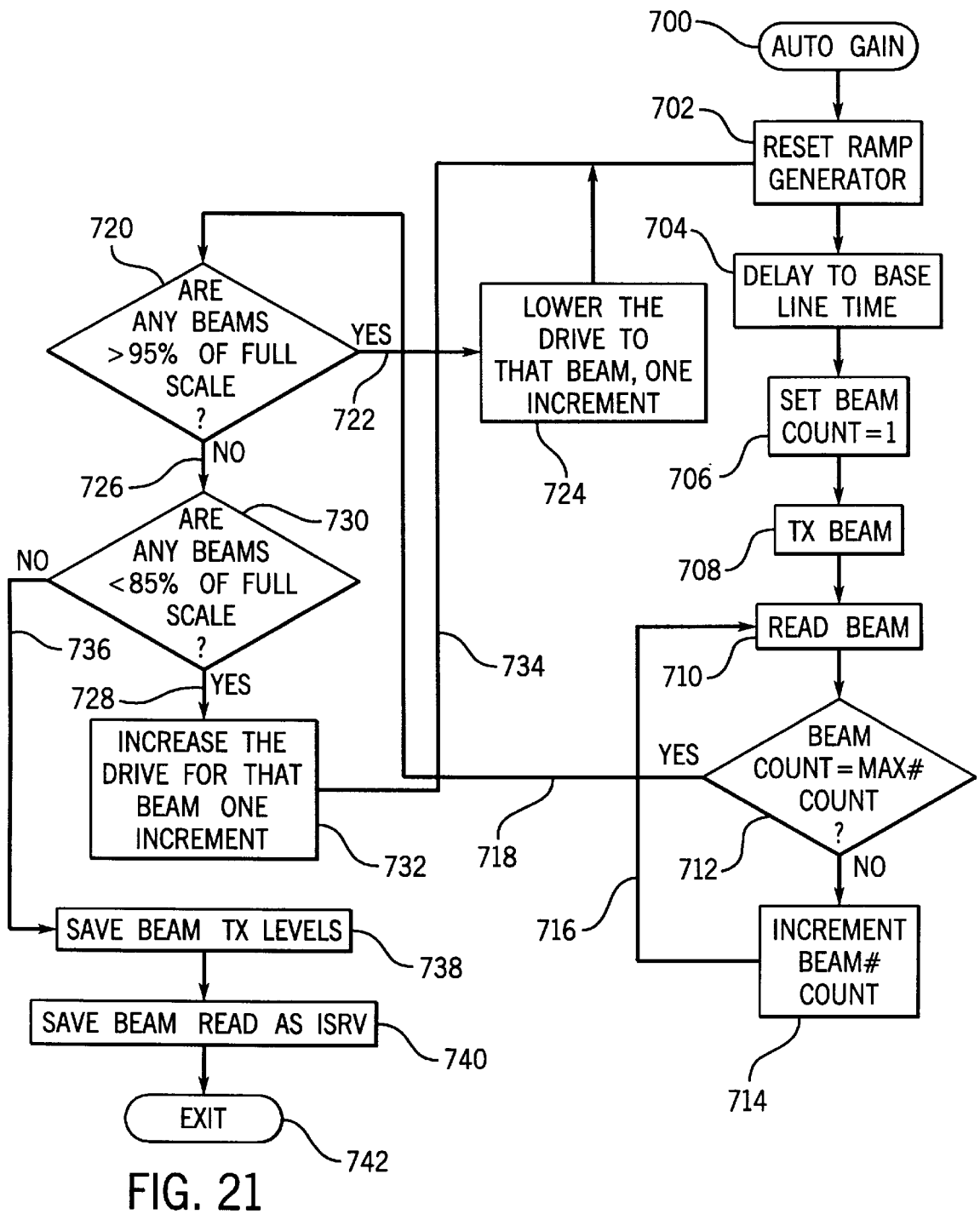

FIG. 21 shows the detail flow of the Auto Gain algorithm 700 of FIG. 15. This subroutine is used to monitor the strength of each beam reception and maximize the returned signal to use all 256 counts of the A/D converter. Initially, the ramp generator 166 of FIG. 13(b) is reset 702, FIG. 21, and a delay is initialized for the Base Line Time 704 as indicated in the graph of FIG. 14. The Beam Count is initialized 706, the first transmitter is energized 708 and that receiver is read 710. If the Beam Count has not reached the Maximum Number Count at 712, the Beam Count is incremented 714 and the transmit, read, comparison, and increment loop 716 is repeated until the Beam Count equals the Maximum Number Count 718, at which time a comparison is made of all the beams to a respective full scale 720. If any beam is greater than 95% of the full scale 722, the drive power is lowered for that beam 724 until it is equal to or less than 95% of full scale at 726. Thereafter, if any of the beams are less than 85% of full scale 728 as determined in comparison 730, the drive power is increased for that transmitter at 732 and the entire Auto Gain loop 734 is reiterated until all received beams are between 85% and 95% 736. The transmit levels for each beam are then saved 738, and each beam read value is saved as an Initial Signal Read Value (ISRV) 740 which completes the Auto Gain subroutine at 742.

Figure 22:
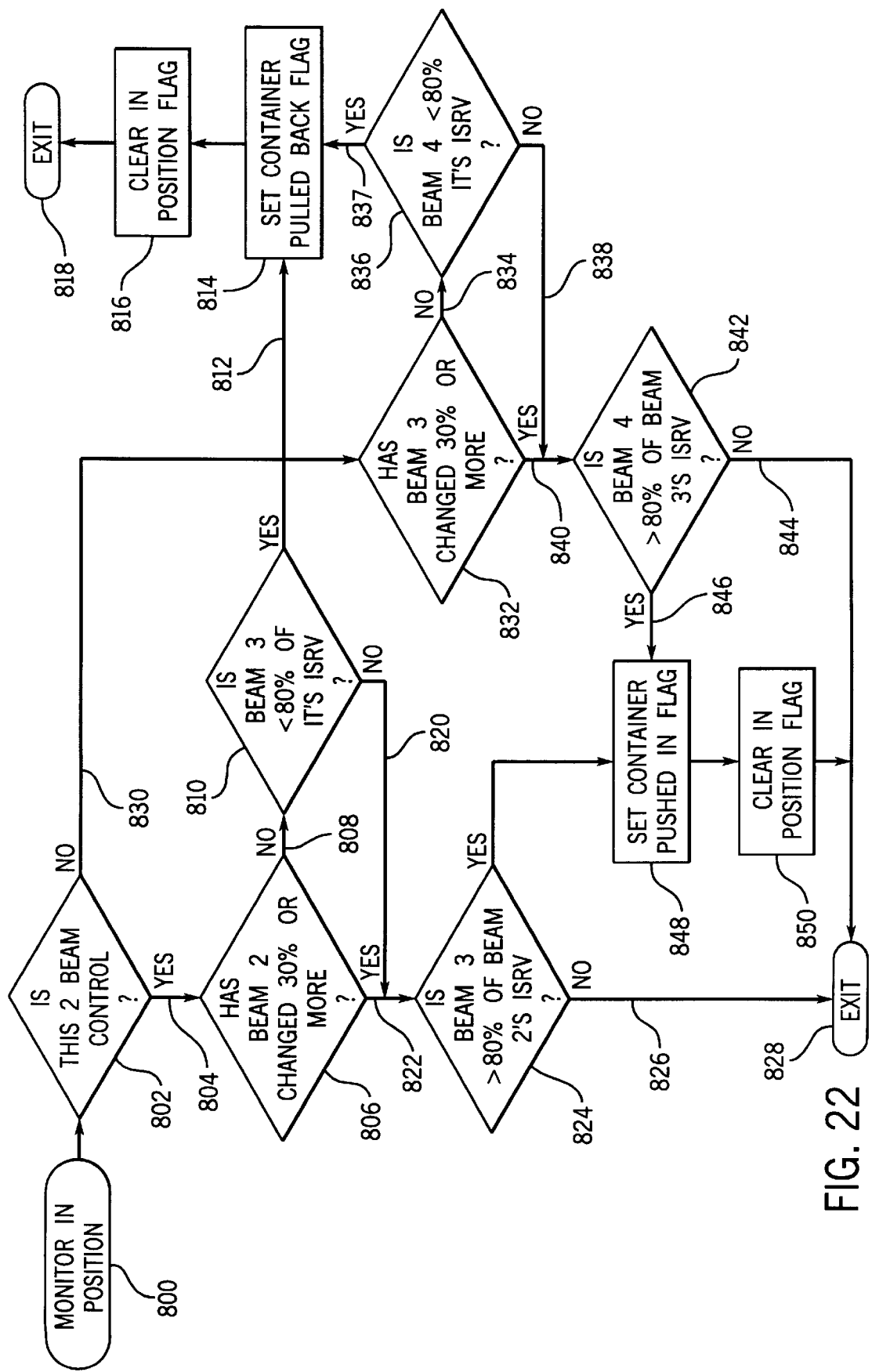

FIG. 22 shows the detailed flow of the Monitor In Position algorithm 800 of FIG. 15. This subroutine is used to monitor a container's position under a dispenser and stop dispensing if the container is suddenly removed or repositioned beyond the positioning limits for the container within the dispensing area. Firstly, a determination is made as to whether this is a two beam or three beam control 802 as was determined in the Select Control Beam algorithm 600. If the control is set to a two beam control 804, a determination is made as to whether the second beam has changed by 30% of more 806. If it has not 808, then the third beam is checked to see if it is less than 80% of its ISRV 810. If it is 812, then the container has been moved out of range and the Container Pulled Back flag is set 814, the In Position flag is cleared 816, and this algorithm is exited at 818. However, if the third beam is not less than 80% of its ISRV 820, or the second beam has changed by 30% or more 822, then a determination is made as to whether the third beam is greater than 80% of the second beams ISRV 824, and if not 826, the container is still adequately in position for a two beam control and the Monitor In Position algorithm 800 is completed at 828.

For a three beam control 830, the third beam is checked to determine if it has changed by 30% or more 832, and if not 834, the fourth beam (the safety beam) is checked to determine if it is less than 80% of its ISRV at 836. If so 837, the container has moved too far out of range and the Container Pulled Back flag is set 814, the In Position flag is cleared 816, and the system exits 818 the Monitor In Position algorithm 800.

If the fourth beam is not less than 80% of its ISRV 838, or if the third beam has changed by 30% or more 840, the fourth beam is checked to see if it is greater than 80% of the third ISRV at 842, and if not 844, the container is still in position and the system can exit at 828. If, on the other hand, the fourth beam is greater than 80% of the third beams ISRV 846, the Container Pushed In flag is set 848 and the In Position flag is cleared 850, thereby indicating that the container has been pushed in too far from the dispenser and the Monitor In Position algorithm 800 can be exited at 828.

Figure 23A:
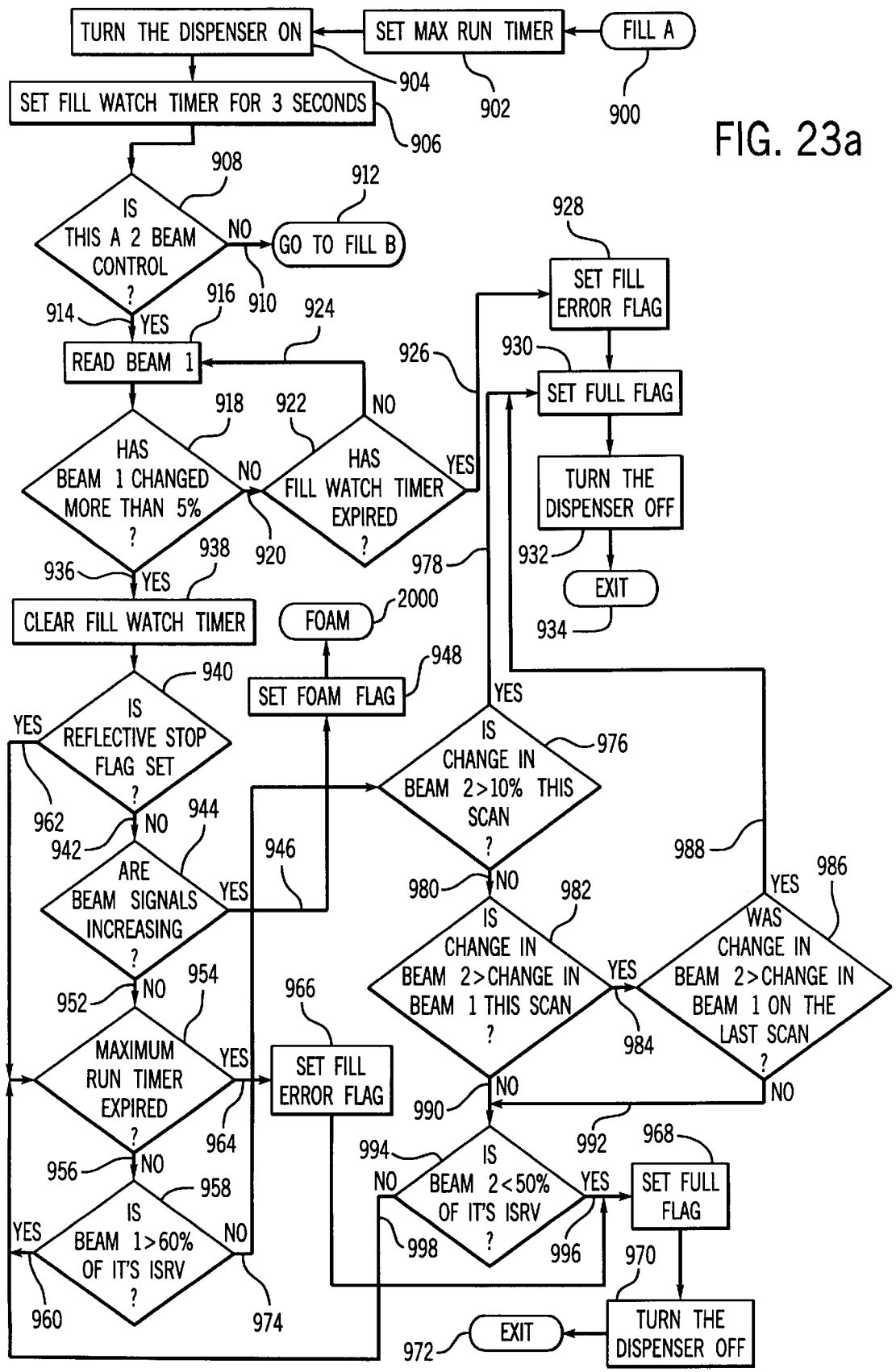
Figure 23B:
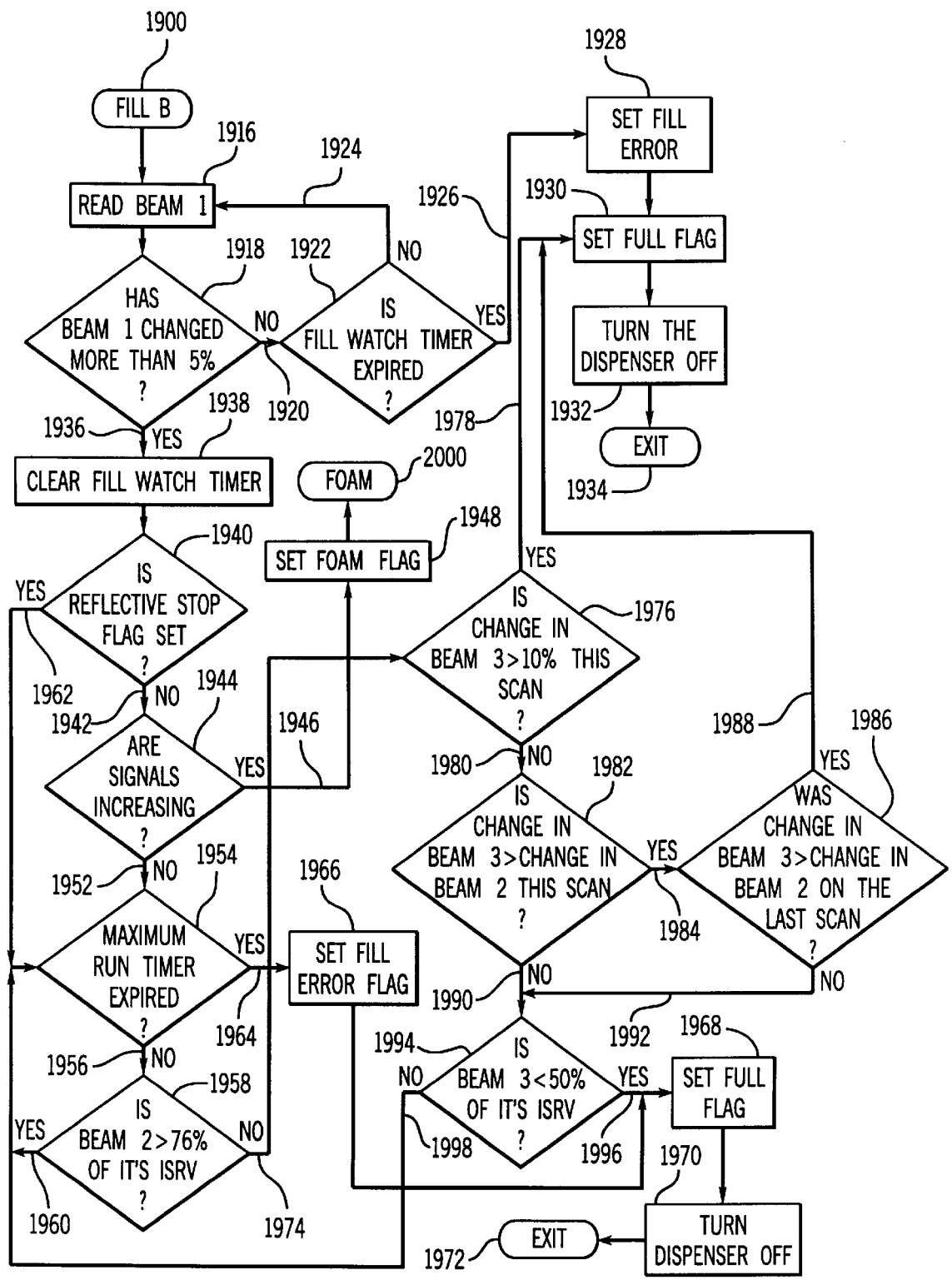
Figure 23C:
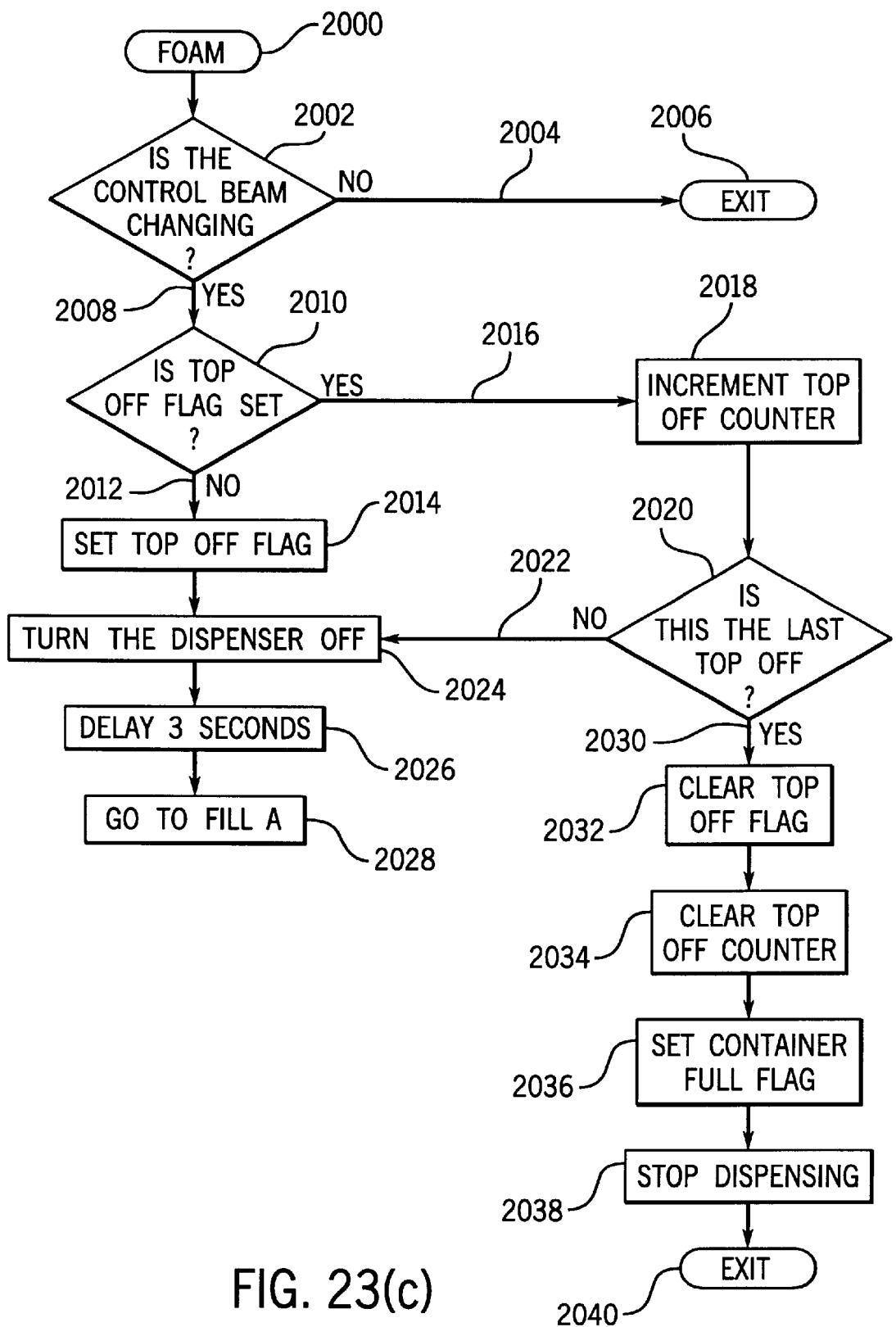

FIGS. 23(*a*)–(*c*) show the detail flow of the fill algorithm 900 of FIG. 15. FIG. 23(*a*) is the first of two fill algorithms and is herein after referred to as Fill A, which is initially called by the main algorithm as shown in FIG. 15. The second fill algorithm, Fill B, is called by Fill A and will be described with reference to FIG. 23(*b*). The Fill A algorithm 900 subroutine is used to fill the container with product as long as the product being dispensed registers a change in level during the first few seconds of dispensing. This subroutine also adjusts the control logic for systems that employ a reflective positioning stop for clear containers, establishes a maximum dispense time to fill a given container of the size determined during the insertion process, and calls a foam subroutine that cycles the dispenser to properly top off a dispensed product if foaming is present.

The Fill A subroutine 900 includes initializing a Maximum Run Timer 902, which is a countdown timer and is application dependant. For example, the timer can be a function of the maximum cup size and the valve flow rate of the dispenser. In one particular application, it was determined that a thirty second countdown timer was sufficient. Next, the dispenser is turned on 904 and a Fill Watch timer is initiated 906. If the system was earlier determined to be a three beam control 908, 910, the Fill B subroutine is called at 912. Fill B will be further described with reference to FIG. 23(*b*). For a two beam control 908, 914 the first receiver is read 916 and a determination is made as to whether the beam has changed by more than 5% of its original reading 918. If not 920, the Fill Watch timer is checked to see if it has expired 922 and as long as it has not expired 924, the algorithm continues to read the first beam 916 and determine if it has changed 918. If there is no change 920 and the Fill Watch timer expires 926, a Fill Error flag is set 928, the Full flag is set 930, the dispenser is turned off 932, and the fill algorithm is exited at 934.

If there is a change in the first beam reading 936, indicating that the container is indeed filling, the Fill Watch timer is cleared 938 and a determination is made as to whether the Reflective Stop flag is set 940. If it is not set 942 and all the beam signals from the receivers are increasing 944, 946, the Foam flag is set 948 and the Foam subroutine 2000 is called, which is described with reference to FIG. 23(*c*). It should be noted that under normal conditions, when dispensed product is filling in the container, the return signals should be decreasing as the fill level increases. It has been determined that foaming action actually makes the signals increase and the foam subroutine allows the foam to subside and continue dispensing until the container is full of dispensed product without foam.

As long as these signals are not increasing 952 and the maximum run timer is not expired 954, 956, the first beam is checked to see if it is greater than 60% of its ISRV 958. If it is 960, or if the reflective stop flag is set 940, 962, then the Maximum Run timer is checked to see if it has expired 954. If it has 964, a Fill Error flag is set 966, the Full flag is set 968, the dispenser is turned off 970, and the fill algorithm is exited 972 because the Run timer expired before the container was full indicating an error, such as the product being dispensed requires refilling in the dispenser machine. Under normal filling conditions, beam 1 will not be greater than 60% of its ISRV at 958 and the algorithm will continue along path 974, indicating that the product is now covering a target area on the interior sidewall of the container for the first beam. The system now begins to monitor the second beam and check to see whether there is a change in the second beam that is greater than 10% on this particular scan 976. If it has 978, the Full flag is set 930, the dispenser is turned off 932, and the fill algorithm exits at 934. If beam 2 has not changed by 10% 980, then the second beam is checked to see if it is greater than the change in beam 1 on this particular scan 982, and if so 984, the change in the second beam is checked to see if it is greater than the change in the first beam on the last scan 986. If it has 988, this indicates that they were two scans of all the receivers while the first target area in the container was covered with product thereby allowing enough time for the container to be filled and the Full flag can then be set 930, the dispenser turned off 932, and the fill algorithm exited at 934. If either the change in the second beam was not greater than the change in the first beam during this scan 982, 990, or the change in the second beam was not greater than the change in the first beam on the last scan 986, 992, the second beam it is checked to see if it is less than 50% of its ISRV 994. If it has 996, the Full flag is set 968, the dispenser is turned off 970, and the system exits at 972. If the second beam is not less than 50% of its ISRV 998, then the Maximum Run timer is checked at 954 and the system loops as previously described until either the Maximum Run timer times out or the container is determined to be full.

FIG. 23(*b*) shows the detail flow of the Fill B subroutine 1900 which is called by the Fill A subroutine 900 of FIG. 23(*a*) when more than two control beams are required at 908. The Fill B subroutine 1900 is for a three beam control and corresponds to the algorithm of Fill A after the control decision at 908 is determined. Accordingly, all corresponding 900 series reference numerals used in Fill A are used for corresponding functions in Fill B, but as 1900 series. One skilled in the art will recognize the similarities between the Fill A subroutine and the Fill B subroutine and extend this algorithm out to as many number of beams as is desired. For example, where Fill A is for a two beam control, and Fill B is for a three beam control, a Fill C subroutine could be for a four beam control where the only changes required between would be similar to those differences between Fill A and Fill B. The Fill B subroutine 1900 includes reading the first receiver 1916 and a determining whether the beam has changed by more than 5% of its original reading 1918. If not 1920, the Fill Watch timer is checked to see if it has expired 1922 and as long as it has not expired 1924, the algorithm continues to read the first beam 1916 and see if it has changed at 1918. If there is no change 1920 and the Fill Watch timer expires 1926, a Fill Error flag is set 1928, the Full flag is set 1930, the dispenser is turned off 1932, and the Fill B algorithm is exited at 1934.

If there is a change in the first beam reading 1936, indicating that the container is indeed filling, the Fill Watch timer is cleared 1938 and a determination is made as to whether the Reflective Stop flag is set 1940. If it is not set 1942 and all the beam signals from the receivers are increasing 1944, 1946, the Foam flag is set 1948 and the Foam subroutine 2000 is called.

As long as these signals are not increasing 1952 and the maximum run timer has not expired 1954, 1956, the second beam is checked to see if it is greater than 60% of its ISRV 1958. If it is 1960, or if the reflective stop flag is set 1962, then the Maximum Run timer is checked to see if it has expired 1954. If it has expired 1964, a Fill Error flag is set 1966, the Full flag is set 1968, the dispensers turned off 1970, and the Fill B algorithm is exited 1972 because the Run timer expired before the container was full indicating an error. Under normal filling conditions, the second beam will not be greater than 60% of its ISRV at 1958, 1974, indicating that the product is now covering the target area on the interior sidewall of the container for the second beam. The system now begins to monitor the third beam and check to see whether there is a change in the third beam that is greater than 10% on this scan 1976. If it has 1978, a Full flag is set 1930, the dispenser is turned off 1932, and the Fill B algorithm exits at 1934. If beam 3 has not changed by 10% 1980, then the third beam is checked to see if it is greater than the change in beam 2 on this particular scan 1982, and if so 1984, the change in the third beam is checked to see if it is greater than the change in the second beam on the last scan at 1986. If it has 1988, this is an indication that there were two scans of all of the receivers while the second target area in the container was covered with product thereby allowing enough time for the container to be filled and the Full flag set 1930, the dispenser turned off 1932 and the fill algorithm exited at 1934. On the other hand, if either the change in the third beam was not greater than the change in the second beam during this scan 1990, or the change in the third beam was not greater than the change in the second beam on the last scan 1992, the third beam is checked to see if is less than 50% of its ISRV 1994, and if it has 1996, the Full flag is set 1968, the dispenser is turned off 1970, and the system exits at 1972. If the third beam is not less than 50% of its ISRV 1998, then the Maximum Run timer is checked at 1954 and the system loops as previously described until the timer times out or the container is full.

As is evident, the decision blocks 1958 and 1994 of Fill B differ from 958 and 994 of Fill A. In Fill B, the control is now checking for a fill level that corresponds to the second beam on the interior wall of the container as a percentage of its ISRV as opposed to the first beam in Fill A for smaller containers. The comparisons in the decisions 1976, 1982, and 1986 in Fill B also differ from the comparisons in 976, 982, and 986 in Fill A in that the comparison is now between the third and second beam, whereas in Fill A the comparison is between the second and the first beam. One skilled in the art will now recognize that a further extension to include further Fill subroutines for additional beam controls is readily evident from this disclosure and such extension can be expected in some applications.

FIG. 23(*c*) shows a detail flow of the foam subroutine 2000 called by the Fill A subroutine 900 of FIG. 23(*a*) and/or by the Fill B subroutine 1900 called in FIG. 23(*b*). When foaming occurs, the foam subroutine 2000 is called to cycle the dispenser on and off to top off the dispensed product to properly fill a container in the event of foaming product. After a number of transmissions from the transmitters, the receivers are monitored to see if the control beam is changing 2002, and if it is not 2004, then there is no foam in the dispensed product, or it is already subsided, and the system exits 2006 the foam subroutine 2000. If the control beam is changing 2008, the Top Off flag is checked 2010, and if it is not set 2012, the Top Off flag is set at 2014. Conversely, if the Top Off flag is already set 2016, the Top Off counter is incremented 2018 and a decision is made as to whether to continue periodically dispensing to Top Off the container or if this should be the last Top Off cycle 2020. If there should be another Top Off cycle 2022, or if the Top Off flag has just been set 2014, the dispenser is turned off 2024, the system is delayed 2026 to allow the foam to settle, and the Fill A subroutine is called 2028. After the last Top Off 2030, the Top Off flag is cleared 2032, the Top Off counter is cleared 2034, the Container Full flag is set at 2036, the dispenser is turned off 2038, and the system exits 2040 the foam subroutine 2000.

Figure 24:
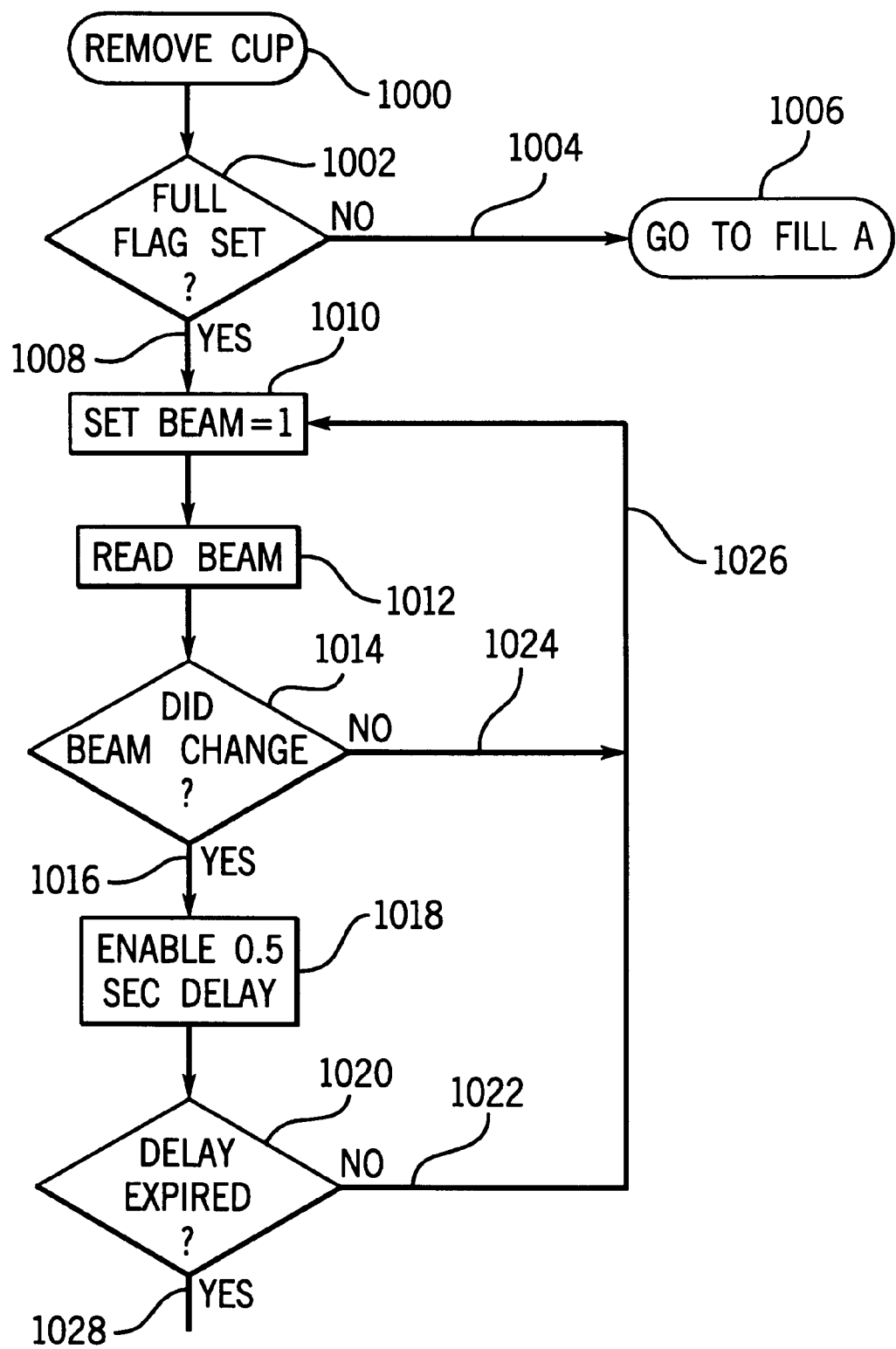

FIG. 24 shows a detail flow of the Remove Cup subroutine 1000 of FIG. 15 which keeps the system in a loop until the container that has been determined to be full is completely removed from under the dispenser. If the Full flag has not yet been set 1002, 1004, the system returns to the Fill A subroutine 1006. If the Full flag has been set 1008, the system is set to watch the first beam 1010, read beam one 1012, and monitor whether beam 1 is changing 1014. If beam one does change 1016, a delay is enabled 1018. During the delay period 1020, 1022, or if beam one is not changing 1024, the system continues in a loop 1026 monitoring the first beam 1010, 1012, 1014 to ensure that beam one changes 1016, and when the delay has expired 1028, thereby indicating a full container has been removed from under the dispenser, the system can exit 1030 the Remove Cup subroutine 1000, and return to the main loop 1100, FIG. 15.

Tables 1–5 show actual results from dispense cycles for various containers with a typical dispensing rate of 4 ounces per second. The tables show sample data recorded by the microcontoller during an actual fill process for each transmitter pair. This data was extracted from the microcontroller's memory table using a computer interface to an output port of the microcontroller. The data is the actual output of the microcontroller's A/D converter. In this case, the full scale reading from the A/D is 255 counts. The data was recorded at a rate of 4 cycles per second and synchronized to the scan rate of the microcontroller. The scan rate of the microcontroller was set at 2 times per second for large containers and at 4 times per second for small containers. In all cases, the dispensing rate of the dispenser was 4 ounces per second.

Table 1 below shows the results for a dispense cycle for a 12 ounce container. The start label is only a reference point. The scan cycle data was monitored and recorded for 32 scan cycles. Scan cycles 1 through 4 indicate the relative strength of the individual beams, defined as the "Calibration Reference" on a per beam basis, and indicate that a reflective stop is not present. Scan cycles 5 through 8 indicate the relative strength of the individual beams as the container is moved into position under the dispenser. The decline in data for TX1–RX1 during scan 8, indicates that the container does not have a top thereon. The relative strength of the beams indicates that the container is empty or near empty and the container is relatively short. The maximum dispense timer would be set for the maximum time required to fill a reference container defined as small.

Scan cycles 9 through 12 indicate the relative strength of the individual beams during auto calibration and that the container will only require a two beam control strategy. Tall, or large, containers will usually employ a three beam in position control strategy. Scan cycles 13 through 16 indicate the relative strength of the individual beams when the container is ready for product to be dispensed. Scan cycles 17 through 20 indicate the relative strength of the individual beams when the container is ready for product to be dispensed, and that product is currently being dispensed into the container. The immediate change in beam 1 indicates that the container has a bottom. Since beam 1 is changing faster than beams 2 and 3, product is within the target window of transmitter TX1.

Scan cycles 21 through 24 indicate the relative strength of the individual beams as the product flows through the individual transmitter targets. Scan cycles 25 through 28 indicate the relative strength of the individual beams as product flows through the individual transmitter targets. The data indicates that product has passed through the target of transmitter TX1 and is flowing through the target of transmitter TX2. The rate of change of the individual beams indicates that the product surface isn't turbulent and that the product is not foaming. Scan cycles 29 and 30 indicate that the product is at the top of the container and near the rim. In this example, the dispenser stopped the flow of product within approximately 0.5 inches from the rim of the container. The distance from the product to the rim is a function of the spacing between the transmitters, the radiation angle of the transmitters, the viewing angle of the receivers and the distance from the transmitters to the rim of the container. Scan cycle 32 indicates that the container is indeed full, since the signals stopped changing at a predictable value after the dispenser was turned off.

TABLE 1

| Comments: | Scan Cycle Data: | TX1-RX1 | TX2-RX2 | TX3-RX3 |
|---|---|---|---|---|
| Start: | | | | |
| Calibration Reference: | 1 | 12 | 12 | 16 |
| (data indicates that a | 2 | 12 | 12 | 16 |
| reflective stop is not | 3 | 12 | 12 | 16 |
| present) | 4 | 12 | 12 | 16 |
| Enter Into Position: | 5 | 40 | 20 | 16 |
| | 6 | 44 | 46 | 16 |
| | 7 | 80 | 60 | 16 |
| | 8 | 66 | 74 | 16 |
| Calibrate: | 9 | 88 | 94 | 16 |
| | 10 | 110 | 120 | 16 |
| | 11 | 170 | 174 | 16 |
| | 12 | 208 | 195 | 16 |
| In Position: | 13 | 208 | 208 | 16 |
| | 14 | 208 | 208 | 16 |
| | 15 | 208 | 208 | 16 |
| | 16 | 208 | 195 | 16 |
| Start Fill: | 17 | 208 | 195 | 16 |
| | 18 | 167 | 176 | 16 |
| | 19 | 148 | 166 | 16 |
| | 20 | 133 | 158 | 16 |
| | 21 | 141 | 150 | 16 |
| | 22 | 107 | 142 | 16 |
| | 23 | 93 | 130 | 16 |
| | 24 | 85 | 115 | 16 |
| | 25 | 73 | 101 | 16 |
| | 26 | 61 | 82 | 16 |
| | 27 | 76 | 70 | 16 |
| | 28 | 30 | 48 | 16 |
| | 29 | 27 | 39 | 16 |
| Full: | 30 | 24 | 24 | 16 |
| | 31 | 25 | 23 | 16 |
| | 32 | 24 | 24 | 16 |

Table 2 shows the results for a dispense cycle for a 32 ounce container. The scan cycle data was monitored and recorded for 48 scan cycles. Scan cycles 1 through 4 indicate the relative strength of the individual beams and define the "Calibration Reference" on a per beam basis, and indicate that a reflective stop is not present. Scan cycles 5 through 8 indicate the relative strength of the individual beams as the container is moved into position under the dispenser. Again, the decline in data for TX1–RX1 during scan 8, indicates that the container does not have a top. The relative strength of the beams indicates that the container is empty or near empty and that the container is relatively tall. The maximum dispense timer would be set for the maximum time required to fill a reference container defined as tall. The overall signal strength indicates that the transmitters are already in calibration for this container.

Scan cycles 9 through 12 indicate the relative strength of the individual beams when the container is ready for product to be dispensed. The container would require a three beam control strategy to ensure the container is in position for dispensing because the container is relatively tall. Scan cycles 13 through 17 indicate the relative strength of the individual beams when the container is ready for product and that product is being dispensed into the container. Since TX1–RX1 has started to change, the container has a bottom.

RX1 is changing faster than beams RX2 and RX3, indicating that the product is within the target window of transmitter TX1.

The rate of change of the signals indicates that the system scan rate should be reduced.

Scan cycles 18 through 25 indicate the relative strength of the individual beams as product flows through the individual transmitter targets. The data indicates that product has passed through the target of transmitter TX1 and is starting to flow into the target of transmitter TX2. The rate of change of the individual beams indicate that the product surface is not turbulent and the product does not have foam. Scan cycles 26 through 33 indicate the relative strength of the individual beams as product flows through the individual transmitter targets. The data indicates that product has passed through the target of transmitter TX2 and is starting to flow through the target of transmitter TX3. The rate of change of the individual beams also indicates that the product surface is not turbulent and that the product does not have foam.

Scan cycles 33 through 41 indicate that the product is at the top of the container and near the rim. In this example, the dispenser stopped the flow of product within 0.5 inches of the rim of the container. In this case, the control did not stop the dispensing of product as early as it would have for a shorter container. The rate of change in signal strength, as product moved through the individual transmitter targets, indicates that the container is large and would require an additional dispensing time to ensure an adequate fill level. Scan cycle 45 indicates that the container is indeed full since the signals stopped changing at a predictable value after the dispenser was turned off.

TABLE 2

| Comments: | Scan Cycle Data: | TX1-RX1 | TX2-RX2 | TX3-RX3 | TX4-RX4 |
|---|---|---|---|---|---|
| Start: | | | | | |
| Calibration Reference: | 1 | 12 | 12 | 16 | 16 |
| (data indicates that a | 2 | 12 | 12 | 16 | 16 |
| reflective stop is not | 3 | 12 | 12 | 16 | 16 |
| present) | 4 | 12 | 12 | 16 | 16 |
| Enter Into Position: | 5 | 42 | 14 | 16 | 16 |
| | 6 | 105 | 64 | 18 | 16 |
| | 7 | 244 | 184 | 166 | 22 |
| | 8 | 219 | 231 | 228 | 24 |
| In Position: | 9 | 219 | 221 | 228 | 24 |
| | 10 | 219 | 221 | 228 | 24 |
| | 11 | 219 | 221 | 222 | 24 |
| | 12 | 219 | 221 | 218 | 24 |
| Start Fill: | 13 | 180 | 210 | 211 | 24 |
| | 14 | 175 | 205 | 211 | 24 |
| | 15 | 160 | 200 | 209 | 24 |
| | 16 | 140 | 200 | 208 | 24 |
| | 17 | 112 | 199 | 205 | 24 |
| | 18 | | | | |
| | 19 | | | | |
| | 20 | | | | |
| | 21 | 90 | 184 | 194 | 24 |
| | 22 | | | | |
| | 23 | | | | |
| | 24 | | | | |
| | 25 | 62 | 166 | 185 | 24 |
| | 26 | | | | |
| | 27 | | | | |
| | 28 | | | | |
| | 29 | 38 | 133 | 166 | 30 |
| | 30 | | | | |
| | 31 | | | | |
| | 32 | | | | |
| | 33 | 36 | 93 | 133 | 36 |
| | 34 | | | | |
| | 35 | | | | |
| | 36 | | | | |
| | 37 | 36 | 56 | 94 | 40 |
| | 38 | | | | |
| | 39 | | | | |
| | 40 | | | | |
| Full: | 41 | 36 | 42 | 56 | 48 |
| | 42 | | | | |
| | 43 | | | | |
| | 44 | | | | |

TABLE 2-continued

| Comments: | Scan Cycle Data: | TX1-RX1 | TX2-RX2 | TX3-RX3 | TX4-RX4 |
|---|---|---|---|---|---|
| | 45 | 37 | 44 | 40 | 46 |
| | 46 | | | | |
| | 47 | | | | |
| | 48 | | | | |

Table 3 shows the results for another dispense cycle for a 32 ounce container where foam is present after a period of dispensing. The scan cycle data was monitored and recorded for 60 scan cycles. Scan cycles 1 through 4 indicate the relative strength of the individual beams, define the "Calibration Reference" on a per beam basis, and that a reflective stop is not present. Scan cycles 5 through 8 indicate the relative strength of the individual beams as the container is moved into position under the dispenser. The decline in data for TX1–RX1 during scan 8, indicates that the container does not have a top. The relative strength of the beams indicates that the container is empty or near empty and the container is relatively tall. The maximum dispense timer would be set for the maximum time required to fill a tall container. The overall signal strength indicates that the transmitters are already in calibration for this container.

Scan cycles 9 through 12 indicate the relative strength of the individual beams when the container is ready for product to be dispensed. The container would again require a three beam control strategy to ensure the container is in position for dispensing for a tall container. Scan cycles 13 through 17 indicate the relative strength of the individual beams when the container is ready for product to be dispensed and product is currently being dispensed into the container. The charge in TX1-RX1 indicates that the container has a bottom. Since TX1-RX1 is changing faster than TX2-RX2 and TX3-RX3, product is within the target window of transmitter TX1. The rate of change of the signals indicates that the system scan rate should be reduced.

Scan cycles 18 through 25 indicates the relative strength of the individual beams as product flows through the individual transmitter targets. The data indicates that product has passed through the target of transmitter TX1 and is starting to enter the target of transmitter TX2. The rate of change of the individual beams indicate that the product has foam.

The signal increase at scan cycle 29 indicates that the foam level is at the target registration for beam $\pi 1$. The signal increase at scan cycle 33 indicates that the foam level is at the target registration for beam $\pi 2$. The signal increase at scan cycle 37 indicates that the foam level is at the tartget registration for beam $\pi 3$. The dispenser is turned off at the time by the control beam, beam $\pi 3$. The dispenser will remain off for a minimum of 3 seconds. If after 3 seconds the signal from beam $\pi 3$ returns to normal, the dispense cycle will continue.

Scan cycles 38 through 52 indicates that the foam is decreasing and that the dispenser should be turned on. At scan cycle 52, the dispenser is turned on, to begin the first product top-off cycle.

Scan cycles 53 through 57 indicate that the product is at the top of the container and near the rim. In this example the dispenser stopped the flow of product within 0.5 inches of the rim of the container. In this case the control did not stop the dispensing of product as early as it would have for a shorter container. The rate of change in signal strength, as product moved through the individual transmitter targets, indicates that the container is large and would require an additional dispensing time to ensure an adequate fill level. The dispenser was turned off at scan cycle 57. Scan cycle 60 indicates that the container is indeed full, since the signals stopped changing after the dispenser was turned off. No additional top off cycles are required.

TABLE 3

| Comments: | Scan Cycle Data: | TX1-RX1 | TX2-RX2 | TX3-RX3 | TX4-RX4 |
|---|---|---|---|---|---|
| Start Calibration Reference: | 1 | 12 | 12 | 16 | 16 |
| (data indicates that a | 2 | 12 | 12 | 16 | 16 |
| reflective stop is not | 3 | 12 | 12 | 16 | 16 |
| present) | 4 | 12 | 12 | 16 | 16 |
| Enter Into Position: | 5 | 50 | 14 | 16 | 16 |
|  | 6 | 110 | 70 | 16 | 16 |
|  | 7 | 250 | 190 | 170 | 16 |
|  | 8 | 210 | 221 | 228 | 24 |
| In Position: | 9 | 210 | 222 | 228 | 24 |
|  | 10 | 210 | 223 | 226 | 23 |
|  | 11 | 210 | 223 | 226 | 23 |
|  | 12 | 210 | 223 | 226 | 24 |
| Start Fill: | 13 | 185 | 223 | 226 | 24 |
|  | 14 |  |  |  |  |
|  | 15 |  |  |  |  |
|  | 16 |  |  |  |  |
|  | 17 | 114 | 201 | 210 | 24 |
|  | 18 |  |  |  |  |
|  | 19 |  |  |  |  |
|  | 20 |  |  |  |  |
|  | 21 | 91 | 186 | 200 | 24 |
|  | 22 |  |  |  |  |
|  | 23 |  |  |  |  |
|  | 24 |  |  |  |  |
| Foam Is Present: | 25 | 90 | 166 | 190 | 24 |
|  | 26 |  |  |  |  |
|  | 27 |  |  |  |  |
|  | 28 |  |  |  |  |
|  | 29 | 120 | 133 | 171 | 39 |
|  | 30 |  |  |  |  |
|  | 31 |  |  |  |  |
|  | 32 |  |  |  |  |
|  | 33 | 120 | 170 | 133 | 39 |
|  | 34 |  |  |  |  |
|  | 35 |  |  |  |  |
|  | 36 |  |  |  |  |
| Stop Dispensing: | 37 | 120 | 185 | 200 | 40 |
| (Foam at beam 3) | 38 |  |  |  |  |
|  | 39 |  |  |  |  |
|  | 40 |  |  |  |  |
|  | 41 | 120 | 180 | 228 | 60 |
|  | 42 |  |  |  |  |
|  | 43 |  |  |  |  |
|  | 44 |  |  |  |  |
|  | 45 | 94 | 120 | 200 | 68 |
|  | 46 |  |  |  |  |
|  | 47 |  |  |  |  |
|  | 48 |  |  |  |  |
|  | 49 | 51 | 80 | 160 | 61 |
|  | 50 |  |  |  |  |
|  | 51 |  |  |  |  |
| Start Dispensing: | 52 |  |  |  |  |
| (Foam has settled) | 53 | 40 | 62 | 150 | 61 |
|  | 54 |  |  |  |  |
|  | 55 |  |  |  |  |
|  | 56 |  |  |  |  |
| Full: | 57 | 56 | 60 | 75 | 68 |
|  | 58 |  |  |  |  |
|  | 59 |  |  |  |  |
|  | 60 | 56 | 60 | 60 | 68 |

Table 4 shows yet another dispense cycle, this time for an opaque 32 ounce container with a reflective stop. The scan cycle data was monitored and recorded for 48 scan cycles but for brevity, this table only illustrates the first 16 cycles. Scan cycles 1 through 4 indicate the relative strength of the individual beams, defined as the "Calibration Reference" on a per beam basis and that a reflective stop is employed. Scan cycles 5 through 8 indicate the relative strength of the individual beams as the container is moved into position under the dispenser. The continual decline in data during these scan cycles indicates that the container does not have a top. The relative strength of the beams indicates that the container is empty or near empty, opaque, and the container is relatively tall. The maximum dispense timer would be set for the maximum time required to fill a reference container defined as tall.

Scan cycles 9 through 12 indicate the relative strength of the individual beams during auto calibration and that the container will require a three beam control strategy. Tall containers usually employ a three beam in position control strategy. Scan cycles 13 through 16 indicate the relative strength of the individual beams when the container is ready for product. The scan cycle data for cycles 17 through 48 are, for all practical purposes, the same as for Table 3.

TABLE 4

| Comments: | Scan Cycle Data: | TX1-RX1 | TX2-RX2 | TX3-RX3 | TX4-RX4 |
|---|---|---|---|---|---|
| Start: |  |  |  |  |  |
|  | 1 | 212 | 212 | 216 | 216 |
|  | 2 | 212 | 212 | 216 | 216 |
|  | 3 | 212 | 212 | 216 | 216 |
|  | 4 | 212 | 212 | 216 | 216 |
| Enter Into | 5 | 150 | 212 | 216 | 216 |
| Position: | 6 | 110 | 170 | 216 | 216 |
|  | 7 | 110 | 130 | 190 | 216 |
|  | 8 | 110 | 112 | 122 | 216 |
| In Position: | 9 | 110 | 112 | 122 | 216 |
|  | 10 | 110 | 112 | 122 | 216 |
|  | 11 | 110 | 112 | 122 | 216 |
|  | 12 | 110 | 112 | 122 | 216 |
| Calibrate: | 13 | 140 | 145 | 151 | 216 |
|  | 14 | 164 | 168 | 166 | 216 |
|  | 15 | 198 | 190 | 192 | 216 |
|  | 16 | 212 | 224 | 200 | 216 |

Table 5 shows another dispense cycle, but for a clear 32 ounce container. The scan cycle data was monitored and recorded for 48 scan cycles, but for brevity, this table only illustrates the first 16 cycles. Scan cycles 1 through 4 indicate the relative strength of the individual beams, defined as the "Calibration Reference" on a per beam basis and that a reflective stop is present. Scan cycles 5 through 8 indicate the relative strength of the individual beams as the container is moved into position under the dispenser. The consistent decline in data during these scan cycles indicates that the container does not have a top. The relative strength of the beams indicates that the container is empty or near empty, visually clear, and the container is relatively tall. The maximum dispense timer would be set for the maximum time required to fill a tall container. Scan cycles 9 through 12 indicate the relative strength of the individual beams during auto calibration and that the container will require a three beam control strategy. Tall containers usually employ a three beam in position control strategy.

Scan cycles 13 through 16 indicate the relative strength of the individual beams which dictate when the container is ready for product to be dispensed. The scan cycle data for cycles 17 through 48 are, for all practical purposes, the same as that for Table 3.

TABLE 5

| Comments: | Scan cycle Data: | TX1-RX1 | TX2-RX2 | TX3-RX3 | TX4-RX4 |
|---|---|---|---|---|---|
| Start: | | | | | |
| | 1 | 212 | 212 | 216 | 216 |
| | 2 | 212 | 212 | 216 | 216 |
| | 3 | 212 | 212 | 216 | 216 |
| | 4 | 212 | 212 | 216 | 216 |
| Enter Into | 5 | 125 | 212 | 216 | 216 |
| Position: | 6 | 125 | 127 | 216 | 216 |
| | 7 | 125 | 133 | 140 | 216 |
| | 8 | 125 | 132 | 142 | 216 |
| In Position: | 9 | 125 | 132 | 142 | 216 |
| | 10 | 125 | 132 | 142 | 216 |
| | 11 | 125 | 132 | 142 | 216 |
| | 12 | 125 | 132 | 142 | 216 |
| Calibrate: | 13 | 144 | 143 | 161 | 216 |
| | 14 | 171 | 162 | 166 | 216 |
| | 15 | 198 | 191 | 188 | 216 |
| | 16 | 214 | 222 | 207 | 216 |

Figure 25:
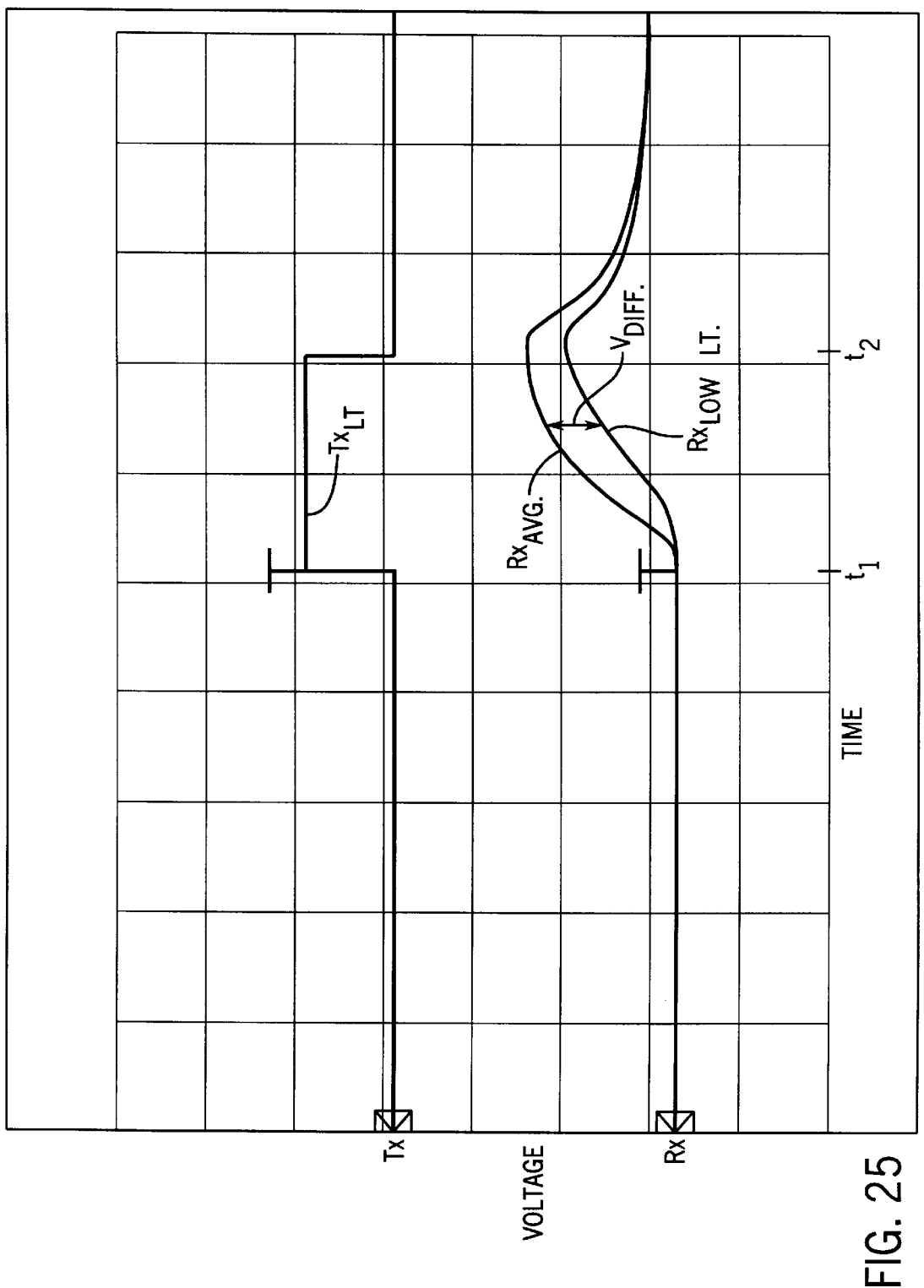
FIG. 25 is a graph of the transmission and reception signals according to one aspect of the invention.
Figure 26:
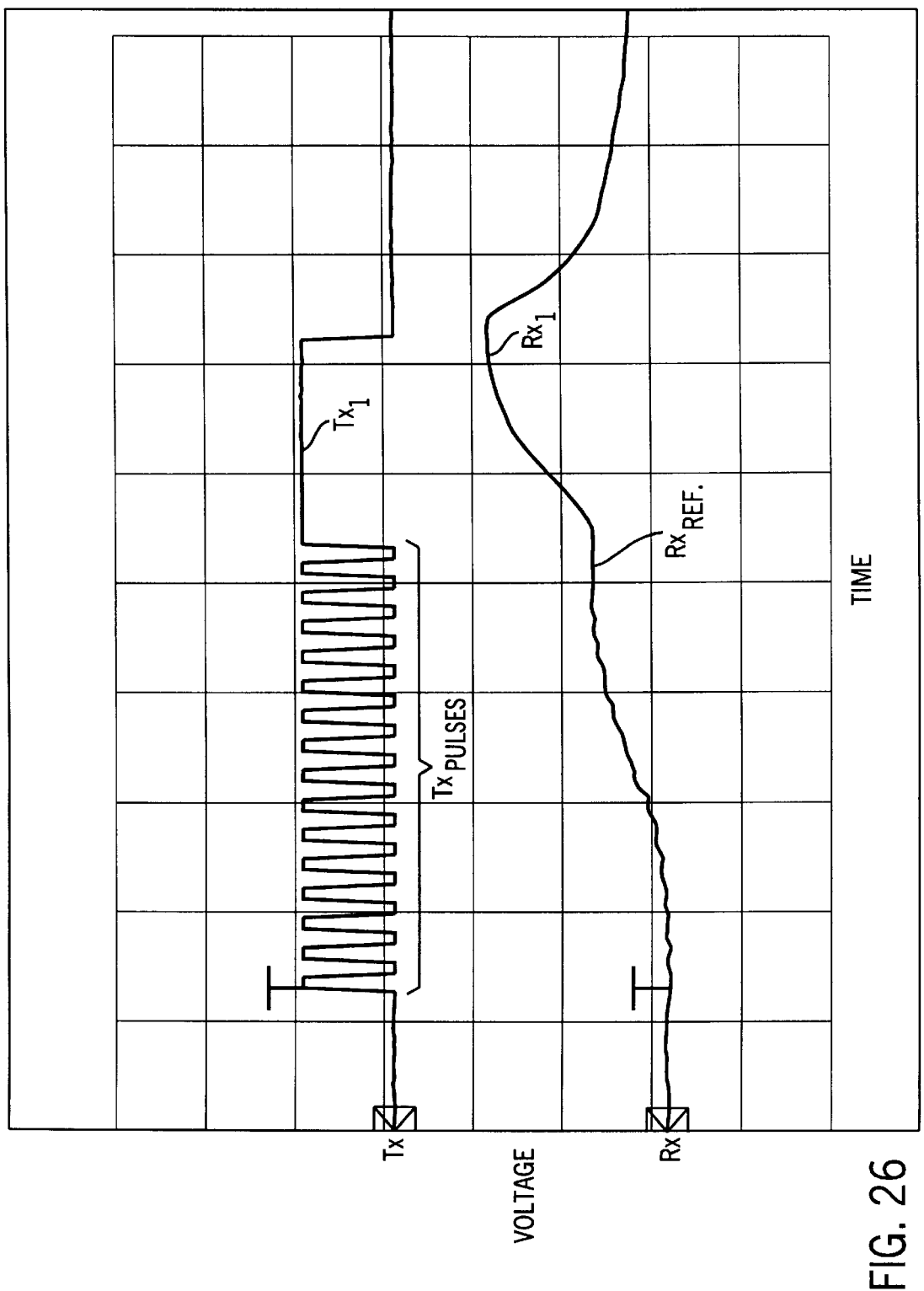
FIG. 26 is a graph of the transmission and reception signals according to another aspect of the invention.

During continued development of the above referenced invention, it was found that in applications where there are variable ambient light conditions, or where there are many reflective objects or surfaces, such as stainless steel as commonly found in restaurant settings, the ambient light conditions and/or excessive reflective light signals can greatly reduce the signal-to-noise ratio as received in the receivers and processed by the microcontroller. Such variance in the signal-to-noise ratio of the background ambient can cause a reduced accuracy in the repeatability of the fill levels for any given size container. This effect is best shown in FIG. 25 in which a transmit signal Tx of infrared light is transmitted, as described above, at a time $T_1$ through a time $T_2$. As shown, the strength of the received signal is dependant on the ambient lighting. For example, under average conditions, a relatively strong received signal $Rx_{avg.}$ is received and processed, whereas under low light conditions the received signal $Rx_{low\ Lt.}$ is substantially lower. The difference $V_{diff.}$ in the received signal Rx has been found to be quite problematic in attempting to achieve accurate repeatability of fill levels. To correct for this repeatability problem and minimize the effects of stray ambient light, FIG. 26 shows how a compensating reference level $Rx_{ref.}$ is created to drastically reduce, if not altogether eliminate any voltage differences in the received signals. As shown in FIG. 26, each transmitter transmits a series of light signal pulses $Tx_{pulses}$ to create the compensating reference $Rx_{ref.}$ as received by each receiver Rx. The detection light signal pulse $Tx_1$ is transmitted and the resulting reception signal $Rx_1$ is received on the compensating reference level signal $Rx_{ref.}$ Which substantially reduces any effects from ambient light or highly reflective conditions.

Figure 27:
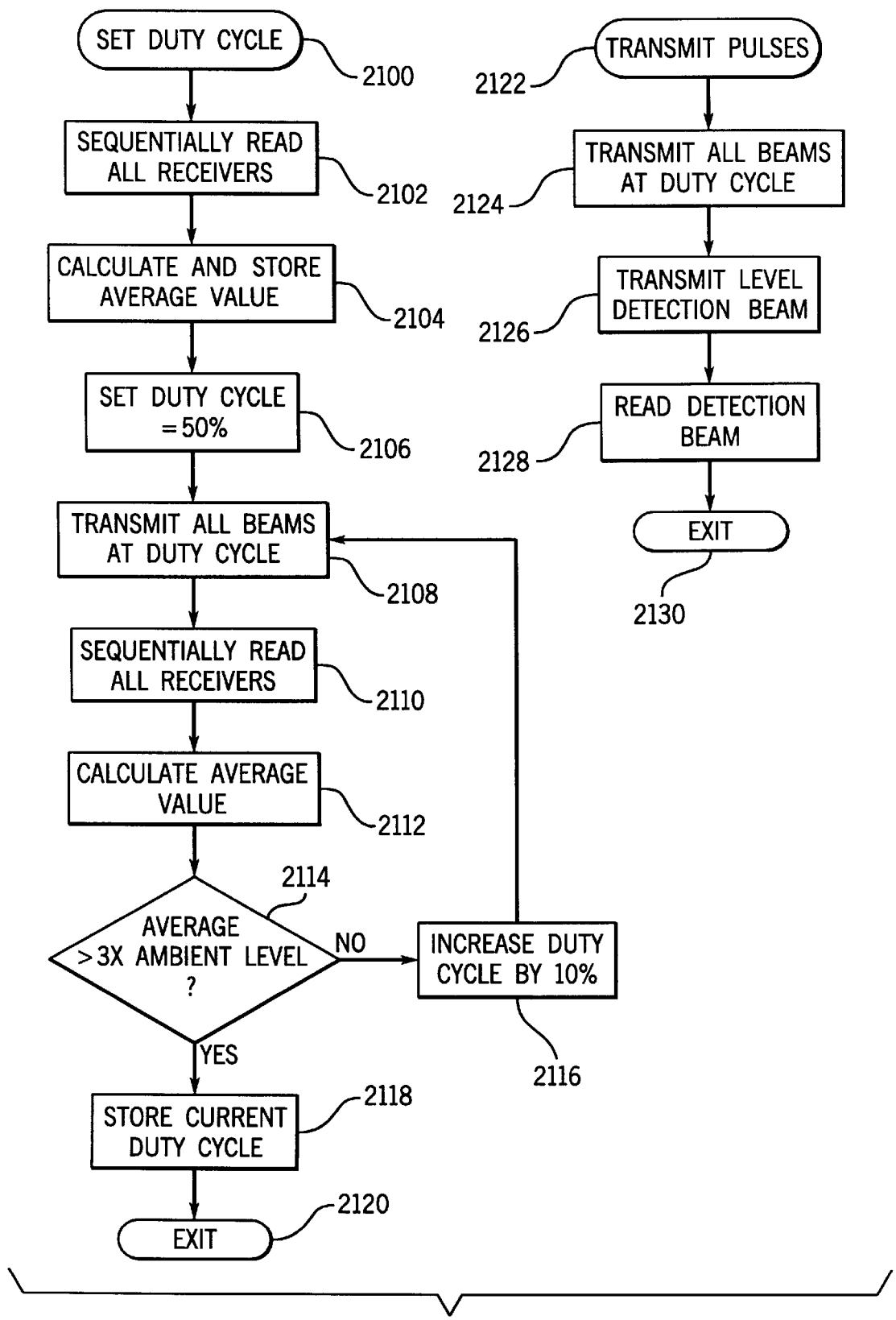
FIG. 27 is a flow chart for the implementation of the aspect of the invention shown in FIG. 26.

This method of compensating for the presence or absence of ambient light in the object detection system is implemented with the algorithm set forth in FIG. 27. The set duty cycle algorithm 2100 begins by sequentially reading each of the receivers at 2102 and then calculating and storing the average value read at 2104. The duty cycle is then set to 50% at 2106. In the present application, it has been found that a 50% duty cycle is optimum. However, one skilled in the art will recognize that varying the duty cycle will vary the compensating reference level desired. Once the duty cycle is set, each of the transmitters are activated at that duty cycle at 2108 and each of the receivers are sequentially read at 2110. The average value is calculated at 2112 and compared to three-times the average ambient level at 2114. The multiple of three is somewhat arbitrary, but it has been found through testing that it is enough to offset ambient lighting conditions and reflection conditions in most circumstances. If the average is not greater than three-times the average ambient level, the duty cycle is increased by 10% at 2116 until it is. At which time, the current duty cycle is stored at 2118 and the set duty cycle is concluded at 2120. Thereafter, the transmit pulses routine 2122 is initiated before any full light transmission to create the compensating reference level. The transmit pulses routine 2122 includes activating each of the transmitters at the previously set duty cycle at 2124 then transmitting the level detection beam at 2126 and reading the detection beam at 2128 to define one complete transmission cycle from 2122 through 2130.

The present invention has been thoroughly described herein as applied in one particular dispensing machine application. However, it is understood that the invention is well suited for use in any of the various types of equivalent dispensing configurations and is not limited to the application described herein and shown in the drawings.

The present invention has been described in terms of the preferred embodiment, and it is recognized that equivalents, alternatives, and modifications, aside from those expressly stated, are possible and within the scope of the appending claims.

We claim:

1. A computer program for use by a dispensing apparatus comprising instructions which, when executed by a computer, cause the computer to:

periodically transmit an energy transmission generally in parallel with a line of reception from a receiver in a downwardly direction toward an interior of a container when present such that at least a portion of the transmission is capable of reflection off an inside surface of the container and back toward the receiver;

monitor the receiver;

detect and monitor signal strengths of reflected transmissions received by the receiver;

determine container presence in response to the signal strengths detected; and activate product dispensing in response to container presence.

2. The computer program of claim 1 which when executed by the computer, cause the computer to determine product fill level in the container by comparing signal strengths detected.

3. The computer program of claim 1 which when executed by the computer, further causes the computer to transmit multiple energy transmissions toward the inside surface of a container sidewall, each directed at a different height inside the container to detect variations in dispensed product.

4. The computer program of claim 3 which when executed by the computer, further causes the computer to periodically activate each transmission and periodically monitor each receiver and, depending on a signal strength of each reflected transmission, determine a relative size of the container.

5. The computer program of claim 4 which when executed by the computer, further causes the computer to dispense product in response to the relative size of the container as determined until each reflected transmission is at a minimal level indicating that the container is fill.

6. The computer program of claim 1 which when executed by the computer, further causes the computer to monitor the signal strength for increasing strength as an indication of foaming in a dispensed product.

7. The computer program of claim 6 which when executed by the computer, further causes the computer to deactivate and activate dispensing cyclically in response to foaming.

8. The computer program of claim 7 which when executed by the computer, further causes the computer to at least partially block transmissions and receptions of associated transmitters and receivers to create the radiation and reception patterns.

9. The computer program of claim 1 which when executed by the computer, further causes the computer to transmit energy with a radiation pattern that is narrower than a reception pattern of the receiver.

* * * * *

UNITED STATES PATENT AND TRADEMARK OFFICE
CERTIFICATE OF CORRECTION

PATENT NO. : 6,227,265 B1
DATED : May 8, 2001
INVENTOR(S) : Skell et al.

It is certified that error appears in the above-identified patent and that said Letters Patent is hereby corrected as shown below:

Column 28,
Lines 47, 49, 51, 52 and 54, change "π" to -- # --.
Line 51, change "tartget" to -- target --

Signed and Sealed this

Sixteenth Day of November, 2004

JON W. DUDAS
*Director of the United States Patent and Trademark Office*